US012472500B1

(12) United States Patent
Lenz et al.

(10) Patent No.: US 12,472,500 B1
(45) Date of Patent: Nov. 18, 2025

(54) MICROFLUIDIC DEVICE

(71) Applicant: Triad National Security, LLC, Los Alamos, NM (US)

(72) Inventors: Kiersten Danielle Lenz, Los Alamos, NM (US); Harshini Mukundan, Los Alamos, NM (US); Pulak Nath, Los Alamos, NM (US); Jennifer Foster Harris, Los Alamos, NM (US); Aaron S. Anderson, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 507 days.

(21) Appl. No.: 17/481,035

(22) Filed: Sep. 21, 2021

Related U.S. Application Data

(60) Provisional application No. 63/081,136, filed on Sep. 21, 2020.

(51) Int. Cl.
  B01L 3/00 (2006.01)
  G01N 33/49 (2006.01)
(52) U.S. Cl.
  CPC . B01L 3/502753 (2013.01); B01L 2300/0803 (2013.01); B01L 2300/0887 (2013.01); B01L 2300/165 (2013.01); G01N 33/491 (2013.01)
(58) Field of Classification Search
  None
  See application file for complete search history.

(56) References Cited

U.S. PATENT DOCUMENTS

2017/0307604 A1    10/2017  Mukundan et al.
2017/0354362 A1*   12/2017  Xu ................... A61B 5/150251

OTHER PUBLICATIONS

Lenz, A Microfluidics-Based Cross-Flow Filtration Platform for Rapid Processing of Amphiphilic Biomarkers from Blood, 2019, Engineering ETDs at UNM Digital Repository, p. 1-53 (Year: 2019).*
Cover page of "A Microfluidics-Based Cross-Flow Filtration Platform for Rapid Processing of Amphiphilic Biomarkers from Blood," Jul. 1, 2019. (Year: 2019).*
UNM Graduate Studies, Thesis Manuscript Submission Procedures Master of Arts or Master of Science, Apr. 2, 2024. (Year: 2024).*
Amasia, et al., "Large-volume centrifugal microfluidic device for blood plasma separation," Bioanalysis, 2(10):1701-1710 (Oct. 2010) (11 pages).

(Continued)

Primary Examiner — Lore R Jarrett
(74) Attorney, Agent, or Firm — Klarquist Sparkman, LLP

(57) ABSTRACT

A microfluidic device can include at least one separation unit defining a first chamber fluidly coupled to an opening and a trap chamber disposed downstream of the opening, and a second chamber that extends radially outwardly of the opening. The second chamber can be offset from the first chamber along a first axis of the device and along a second axis of the device. The separation unit can further comprise a membrane disposed between the first and second chambers and extending across the opening, the membrane being configured such that when a sample is received in the first chamber and the device is rotated, the sample flows across the membrane and filtrate passes through the membrane into the second reservoir and residue flows into the trap chamber.

15 Claims, 14 Drawing Sheets

(56) References Cited

OTHER PUBLICATIONS

Anand, et al., "Fluorescence quenching effects of hemoglobin on simulated tissue phantoms in the UV-Vis range," Meas. Sci. Technol. 23:025502 (2012) (8 pages).

Blattert, et al., "Microfluidic blood/plasma separation unit based on microchannel bend structures," Proceedings of the 3" Annual International IEEE EMBS Special Topic—Conference on Microtechnologies in Medicine and Biology, Kahuku, Oahu, Hawaii (May 12-15, 2005) (4 pages).

Bowen, et al., "Theoretical Descriptions of Membrane Filtration of Colloids and Fine Particles: An Assessment and Review," Advances in Colloid and Interface Science, 56:141-200 (1995) (60 pages).

Browne, et al., "A lab-on-a-chip for rapid blood separation and quantification of hematocrit and serum analytes," Lab Chip, 11:2440 (Jun. 2011) (8 pages).

CDC.gov, "A Quick Reference Tool for Hemolysis Status," https://www.cdc.gov/ncezid/dvbd/stories/research-lab-diagnostics/hemolysis-palette.html?CDC_AA_refVal=https%3A%2F%2Fwww.cdc.gov%2Fncezid%2Fdvbd%2Fstories%2Fhemolysis-palette.html (Jun. 9, 2021) (2 pages).

Cho, "Centrifugal Microfluidics for Biomedical Applications," 15th Int. Conf. Miniaturized Syst. Chem. Life. Sci. 2011, MicroTAS 2011 (6 pages).

Dimov, et al., "Stand-alone self-powered integrated microfluidic blood analysis system (SIMBAS)," Lab Chip, 11:845-850 (Mar. 7, 2011) (7 pages).

Gorkin, et al., "Centrifugal microfluidics for Biomedical Applications," Lab Chip, 10:1758-1773 (Jul. 2010) (17 pages).

Haeberle, et al., "Centrifugal extraction of plasma from whole blood on a rotating disk," Lab Chip, 6:776-781 (Jul. 2006) (7 pages).

Hin, et al., "Membrane-based sample inlet for centrifugal microfluidic cartridges," Microelectronic Engineering 187-188:78-83 (2018) (6 pages).

Homsy, et al., "Development and validation of a low cost blood filtration element separating plasma from undiluted whole blood," Biomicrofluidics, 6:012804 (2012) (9 pages).

Jakhar, et al., "Current Status of Pediatric Tuberculosis Diagnostics, Needs, and Challenges," Diagnosis and Management of Tuberculosis, ResearchGate (May 2019) (14 pages).

Jakhar, et al., "Interaction of amphiphilic lipoarabinomannan with host carrier lipoproteins in tuberculosis patients: Implications for blood-based diagnostics," PLoS One 16(4):e0243337 (Apr. 7, 2021) (15 pages).

Kang, et al., "A continuous flow micro filtration device for plasma/blood separation using submicron vertical pillar gap structures," J. Micromechanics Microengineering, 24(8):087001 (2014) (7 pages).

Kim, et al., "Fully automated, on-site isolation of cfDNA from whole blood for cancer therapy monitoring," Lab Chip, 18:1320-1329 (2018) (10 pages).

Kinahan, et al., "Density-Gradient Mediated Band Extraction of Leukocytes from Whole Blood Using Centrifugo-Pneumatic Siphon Valving on Centrifugal Microfluidic Discs," PLoS One 11(5):e0155545 (May 11, 2016) (13 pages).

Kubicek-Sutherland, et al., "Detection of Lipid and Amphiphilic Biomarkers for Disease Diagnostics," Biosensors, 7:25 (Jul. 4, 2017) (24 pages).

Kubicek-Sutherland, et al., "Membrane Insertion for Direct Detection of Lipoteichoic Acid," Trans. Mat. Res. Soc. Japan, 42(4):101-105 (Aug. 1, 2017) (5 pages).

Kubicek-Sutherland, et al., "Direct detection of bacteremia by exploiting host-pathogen interactions of lipoteichoic acid and lipopolysaccharide," Scientific Reports, 9:6203 (Apr. 17, 2019) (14 pages).

Kuo, et al., "Plasma separation and preparation on centrifugal microfluidic disk for blood assays," Microsystem Technologies (Jan. 10, 2015) (13 pages).

Lee, et al., "A fully automated immunoassay from whole blood on a disc," Lab Chip, 9:1548-1555 (Mar. 5, 2009) (8 pages).

Lee, et al., "All-in-one centrifugal microfluidic device for size-selective circulating tumor cell isolation with high purity," Anal. Chem., 86:11349-11356 (2014) (8 pages).

Li, et al., "Out-of-plane microvalves for whole blood separation on lab-on-a-CD," J. Micromech. Microeng., IOP Publishing, Inc., 20:105024 (Sep. 29, 2010) (11 pages).

Liu, et al., "A fully integrated and automated testing device for PCR-free viral nucleic acid detection in whole blood," Lab Chip, 18:1928-1935 (2018) (8 pages).

Mielczarek, et al., "Microfluidic blood plasma separation for medical diagnostics: Is it worth it?" Lab Chip, 16:3441 (Aug. 1, 2016) (8 pages).

Moen, et al., "A Centrifugal Microfluidic Platform That Separates Whole Blood Samples into Multiple Removable Fractions Due to Several Discrete but Continuous Density Gradient Sections," PLoS One 11(4):e0153137 (Apr. 7, 2016) (11 pages).

Moneriz, et al., "Haemoglobin interference and increased sensitivity of fluorimetric assays for quantification of low-parasitaemia Plasmodium infected erythrocytes," Malaria Journal, 8:279 (Dec. 4, 2009) (10 pages).

Mukundan, et al., "Waveguide-based Biosensors for Pathogen Detection," Sensors, 9:5783-5809 (Jul. 21, 2009) (27 pages).

Mukundan, et al., "Quantitative multiplex detection of pathogen biomarkers on multichannel waveguides," Anal. Chem., 82:136-144 (Jan. 1, 2010) (9 pages).

Mukundan, et al., "Rapid detection of *Mycobacterium tuberculosis* biomarkers in a sandwich immunoassay format using a waveguide-based optical biosensor," Tuberculosis (Edinb), 92(5):407-416 (Sep. 2012) (17 pages).

Noormohamed, et al., "Detection of lipopolysaccharides in serum using a waveguide-based optical biosensor," SPIE BiOS, 20:10072 (2017) (10 pages).

Park, et al., "Continuous plasma separation from whole blood using microchannel geometry," 3rd Annual International IEEE EMBS Special Topic Conference on Microtechnologies in Medicine and Biology Kahuku, Oahu, Hawaii, 8-9 (May 12-15, 2005) (2 pages).

Phurimsak, et al., "Magnetic particle plug based assays for biomarker analysis," Micromachines, 7(5):77 (Apr. 26, 2016) (18 pages).

Sakamuri, et al., "Association of lipoarabinomannan with human high density lipoprotein in blood: Implications for bio-distribution and serum diagnostics," Tuberculosis, 93(3):301-307 (May 2013) (13 pages).

Simoni et al., "Hemoglobin interference with an enzyme-linked immunosorbent assay for the detection of tumor necrosis factor-alpha," Analytica Chimica Acta, 313:1-14 (Mar. 14, 1995) (14 pages).

Song, et al., "Point-of-care technologies for molecular diagnostics using a drop of blood," Trends in Biotechnology 32:132 (Mar. 2014) (17 pages).

Sterlitech Corporation Promotional, "Polycarbonate Track Etch (PCTE) Membrane Filters," Sterlitech.com (1 page brochure).

Sterlitech Corporation Promotional, "Polyester Membrane Filters," Sterlitech.com (1 page brochure).

Stromberg, et al., "Membrane Insertion for the Detection of Lipopolysaccharides: Exploring the Dynamics of Amphiphile-in-Lipid Assays," PLOS One, 11(5):e0156295 (May 26, 2016) (20 pages).

Stromberg, et al., "Detection methods for lipopolysaccharides: past and present," Intech, Ch 8, 141-168 (2017) (28 pages).

Sun, et al., "A new method for centrifugal separation of blood components: Creating a rigid barrier between density-stratified layers using a UV-curable thixotropic gel," J. Mater. Chem., 22:2378-2382 (2012) (8 pages).

Tang, et al., "A review of biomedical centrifugal microfluidic platforms," Micromachines, 7:26 (Feb. 6, 2016) (29 pages).

Tripathi, et al., "Microdevice for plasma separation from whole human blood using biophysical and geometrical effects," Scientific Reports, 6:26749 (Jun. 9, 2016) (15 pages).

Valera, et al., "A microfluidic biochip platform for electrical quantification of proteins," Lab Chip, 8:1461-1470 (2018) (10 pages).

Van Zwieten, et al., "From cooperated to uncorrelated clogging in cross-flow microfluidic membranes," Scientific Reports, 8:5687 (Apr. 9, 2018) (10 pages).

(56) References Cited

OTHER PUBLICATIONS

Wang, et al., "A self-powered, one-step chip for rapid, quantitative and multiplexed detection of proteins from pinpricks of whole blood," Lab Chip, 10(22):3157-3157 (Nov. 21, 2010) (10 pages).

Wang, et al., "Tangential Flow Microfiltration for Viral Separation and Concentration," Micromachines, 10:320 (May 12, 2019) (13 pages).

Boehme et al., "Detection of mycobacterial lipoarabinomannan with an antigen-capture ELISA in unprocessed urine of Tanzanian patients with suspected tuberculosis," Dept. of Infectious Diseases and Tropical Medicine, LMU, Univ. of Munich, Munich, Germany (Aug. 31, 2005) (8 pages).

Kim et al., "Size-Selective, Clog-Free Isolation of Rare Cancer Cells from Whole Blood at a Liquid—Liquid Interface," American Chemical Society, 89, 1155-1162 (Nov. 28, 2016) (8 pages).

Mukundan et al., "Optimizing a Waveguide-Based Sandwich Immunoassay for Tumor Biomarkers: Evaluating Fluorescent Labels and Functional Surfaces," American Chemical Society (Jan. 27, 2009) (9 pages).

Sano et al., "Microfluidic techniques for the detection, manipulation and isolation of rare cells," Woodhead Publishing Limited (2012) (21 pages).

\* cited by examiner

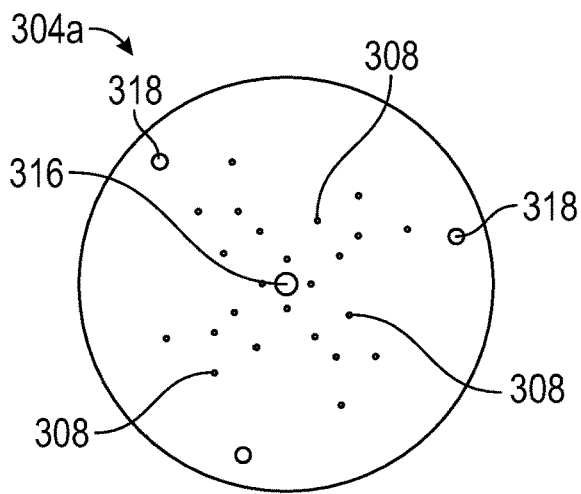
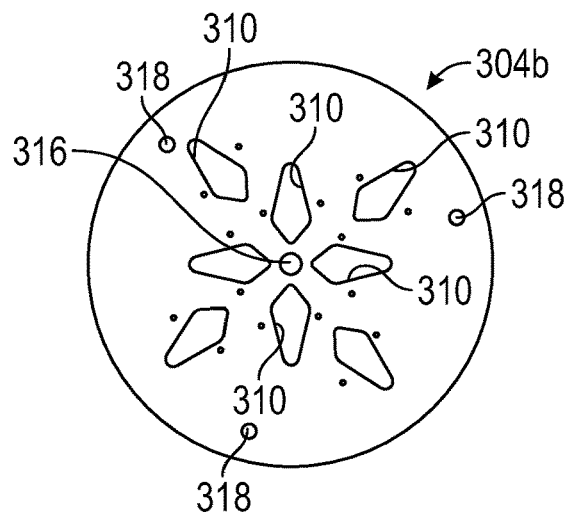
FIG. 21A  FIG. 21B
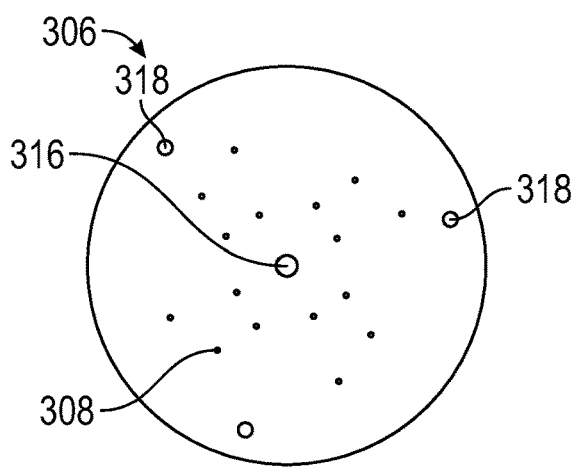
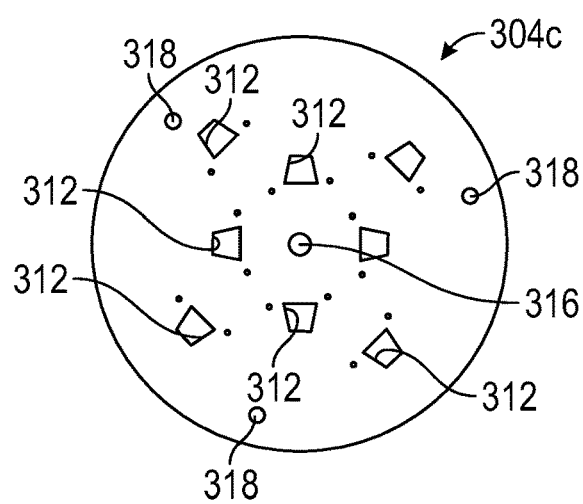
FIG. 21C  FIG. 21D
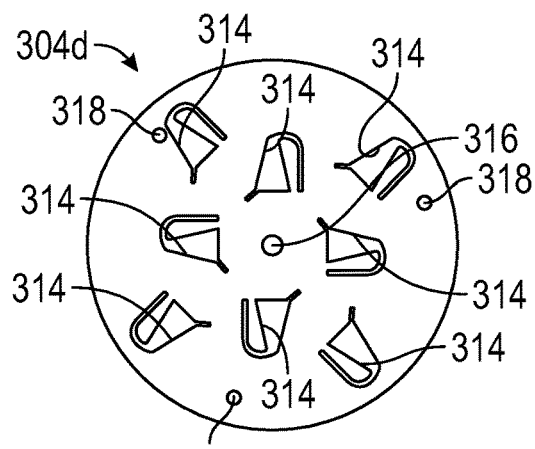
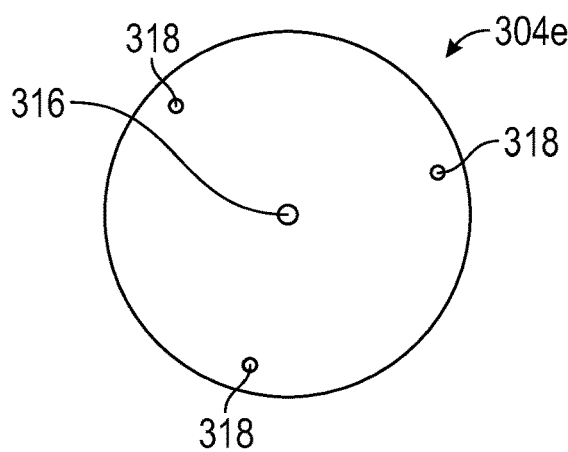
FIG. 21E  FIG. 21F

MICROFLUIDIC DEVICE

CROSS-REFERENCE TO RELATED APPLICATION

The present application claims the benefit of U.S. Provisional Application No. 63/081,136, filed Sep. 21, 2020, which is incorporated herein by reference.

ACKNOWLEDGMENT OF GOVERNMENT SUPPORT

This invention was made with government support under Contract No. 89233218CNA000001 awarded by the U.S. Department of Energy/National Nuclear Security Administration. The government has certain rights in the invention.

FIELD

The present disclosure concerns embodiments of microfluidic devices for use in filtration procedures.

BACKGROUND

The separation of serum from whole blood can be a first step in many clinical diagnostic blood tests, since serum contains biomarkers, whether autogenic or pathogenic, for disease diagnosis and monitoring. Bacterial biomarkers are released into the host's blood stream rapidly after infection; early detection and specific treatment of bacterial infections can help prevent the spread of antimicrobial resistance, save lives, and reduce the chances of outbreaks. However, typical detection procedures require trained personnel and multistep laboratory procedures. Accordingly, a need exists in the art for improved devices and systems capable of providing diagnoses at the point of need and providing rapid intervention solutions.

SUMMARY

In a representative example a device comprises at least one separation unit, defining a first chamber fluidly coupled to an opening and a trap chamber disposed downstream of the opening, the at least one separation unit further defining a second chamber that extends radially outwardly of the opening, the second chamber being offset from the first chamber along a first axis of the device and along a second axis of the device, and a membrane. The membrane can be disposed between the first and second chambers and extending across the opening, the membrane being configured such that when a sample is received in the first chamber and the device is rotated, the sample flows across the membrane and filtrate passes through the membrane into the second chamber and residue flows into the trap chamber.

In some or all embodiments, the opening is a first opening, the trap chamber is a first trap chamber, and the second chamber is fluidly coupled to a second opening and a second trap chamber, the membrane extending across the second opening such that when the device is rotated, filtrate disposed in the second chamber flows across the membrane such that the filtrate passes through the membrane into a third chamber extending radially outwardly of the second opening and residue of the filtrate is disposed in the second trap chamber.

In some or all embodiments, the second chamber is radially offset from the first chamber toward a radially outer edge of the device, and wherein the third chamber is radially offset from the second chamber toward a radially outer edge of the device.

In some or all embodiments, the first chamber is configured to receive 90 µL or less of sample liquid.

In some or all embodiments, the device further comprises an inlet port fluidly coupled to the first chamber, and an outlet port fluidly coupled to the third chamber. In some such embodiments, the device further comprises a seal layer disposed over the inlet port and the outlet port.

In some or all embodiments, the first and third chambers are defined between first, second, and third substrates, the third substrate defining the first and second openings.

In some or all embodiments, the membrane comprises hydrophilic polycarbonate.

In some or all embodiments, the separation unit is a first separation unit and wherein the device further comprises a one or more additional separation units.

In some or all embodiments, the device is a circular disk, and the at least one separation unit is one of a plurality of separation units arrayed circumferentially around the circular disk.

In some or all embodiments, the device is a circular disk, the at least one separation unit comprises an inlet in fluid communication with the first chamber and an outlet in fluid communication with the second chamber, the outlet is radially outward of the inlet on the circular disk.

In another representative embodiment, a system can comprise a first microfluidic separation unit defining a plurality of chambers in fluid communication and separated by a permeable membrane, the first microfluidic separation unit being configured to filter a first filtrate from whole blood by flowing whole blood through the permeable membrane between sequential chambers in a plurality of cross-flow filtration steps; and a second microfluidic separation unit configured to separate the first filtrate into a second filtrate and a residue comprising amphiphilic biomarkers indicative of bacterial infection.

In some or all embodiments, the plurality of chambers defined by the first microfluidic separation unit includes a first chamber and a third chamber disposed radially outwardly of the first chamber, the first chamber including fluidly coupled to a first opening and a first trap chamber disposed radially outwardly of the first opening, and a second chamber that extends radially outwardly of the first opening, the second chamber being offset from the first chamber and the third chamber along a first thickness axis of the first separation unit, the second chamber comprising being fluidly coupled to a second opening and a second trap chamber disposed radially outwardly of the second opening; and wherein the permeable membrane extends across the first and second openings, the membrane being configured such that when a sample is received in the first chamber and the first separation unit is rotated, the sample flows across the membrane and a first filtrate passes through the membrane and the first opening into the second chamber and such that filtrate disposed in the second chamber flows across the membrane such that the first filtrate passes through the membrane and the second opening into the third chamber.

In some or all embodiments, the second microfluidic separation unit defines a first chamber and a second chamber, the first chamber including fluidly coupled to a first opening and a first trap chamber disposed radially outwardly of the first opening, the second chamber that extending radially outwardly of the first opening, the second chamber and being offset from the first chamber along a first thickness axis and a second longitudinal axis of the second separation unit, the second chamber comprising a second trap chamber disposed radially outwardly of the first opening; and a membrane extending across the first opening, the membrane being configured such that when the first filtrate is received in the first chamber and the second separation unit is rotated, the first filtrate flows across the membrane and the second filtrate passes through the membrane and the first opening into the second chamber and the residue flows into the first trap chamber.

In some embodiments, the first microfluidic separation unit is disposed on a first microfluidic chip and the second microfluid separation unit is disposed on a second microfluidic chip.

In some embodiments, the first microfluidic separation unit and the second microfluidic separation unit are disposed on a single microfluidic chip.

In another representative embodiment, a multilayered microfluidic device can comprise a plurality of microfluidic substrates disposed in a stacked arrangement to define a first reservoir, a second reservoir, and a third reservoir, the second reservoir being separated from the first reservoir and the third reservoir by a membrane, the first, second, and third reservoirs being radially offset from each other toward a radially outer edge of the multilayered microfluidic device. The first and second reservoirs can be in fluid communication with one another through the membrane at a first window such that a sample disposed in the first reservoir flows across the membrane allowing filtrate to pass through the membrane into the second reservoir. The second and third reservoirs can be in fluid communication with one another through the membrane at a second window such that the filtrate in the second reservoir flows across the membrane allowing the filtrate can pass through the membrane a second time into the third reservoir.

In some or all embodiments, the plurality of substrates comprises five substrates, wherein the first, second, and fourth substrates comprise acrylic and the third and fifth substrates comprise polycarbonate, and wherein the membrane is disposed between the second and third substrates.

In some or all embodiments, the second reservoir is offset from the first reservoir along a thickness of the multilayered microfluidic device.

In some or all embodiments, the second reservoir partially overlaps with the first reservoir and the third reservoir in the radial direction.

BRIEF DESCRIPTION OF THE DRAWINGS

FIGS. 21A-21F are top plan views of the various layers of the microfluidic device of FIG. 20.

DETAILED DESCRIPTION

Figure 2:
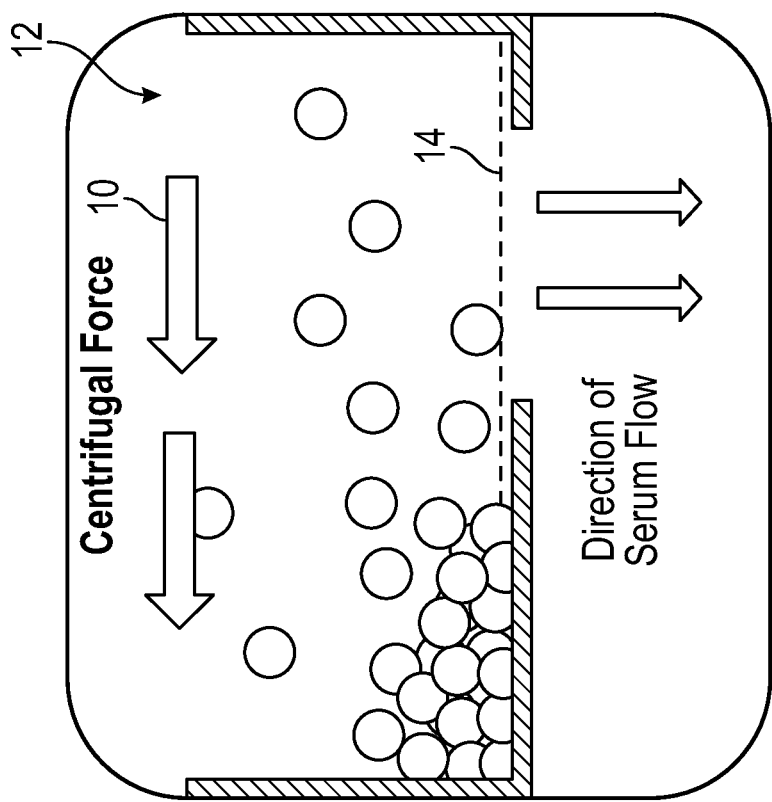
FIG. 2 illustrates a cross-flow filtration device, according to one embodiment.

The separation of biomarkers from blood in the field, allowing for the successful removal of biomarkers for diagnostics applications, is not always readily possible using known methods and devices. The situation is further complicated by the need to separate hydrophobic signatures such as lipids from blood. Disclosed herein, are microfluidic systems for cross-flow filtration processes capable of centrifugal separation of blood to serum at the point of need, using a tiered approach and a system that is compatible with both hydrophilic and hydrophobic biomarkers.

The disclosed microfluidic systems can be used as part of a universal diagnostic strategy for all bacterial pathogens, including the development of assays to quickly detect biomarkers indicative of bacterial infection. In certain embodiments, early detection and specific treatment of bacterial infections can prevent or mitigate the spread of antimicrobial resistance, save lives, and/or reduce the chances of outbreaks. Bacterial infections produce bacterial biomarkers that are released into the subject's bloodstream. Typically, biomarkers targeted by detection assays are the same as those targeted by the human innate immune response, often lipidated sugars (e.g., lipoglycans or glycolipids, such as lipopolysaccharide, lipoteichoic acid, and lipoarabinomannan, etc.).

The amphiphilic biochemistry of such bacterial biomarkers causes them to be sequestered or carried by host lipoprotein carriers (e.g., high density lipoproteins HDL and/or low density lipoproteins LDL). Accordingly, the amphiphilic biomarkers can be released from the lipoprotein carriers to enable detection via enzyme-linked immunosorbent assays (ELISAs), waveguide-based biosensors, or other methods. In order to allow detection of such biomarkers within the blood, the disclosed filtration processes can: (1) separate the filtrate (e.g., serum) from the residue (e.g., blood cells) while preserving the integrity of the lipidic biomarkers, and (2) separate the amphiphilic lipidic biomarkers from the filtrate (e.g., serum) for detection and diagnosis. As used herein, "amphiphilic biomarkers" are biomarker molecules including both hydrophilic and hydrophobic properties.

Current methods for biomarker separation and detection require trained laboratory personnel, multi-step laboratory procedures, and relatively high-volume blood samples (when compared to the volume used in the devices disclosed herein). While effective, such methods do not allow use in a point-of-care setting. Accordingly, the described embodiments of microfluidic systems can be configured to automate the sample preparation (e.g., filtration) process such that it can be performed at the point of care, while preserving the quality of the sample and requiring minimal instrumentation. The disclosed embodiments are advantageously configured to process small volumes of whole blood, have a low cost of production, and offer a minimal or specified loss of sample integrity during processing. Furthermore, additional processing, detection, and/or diagnostic steps can be integrated into the microfluidic devices if required for specific applications. Lipidic and amphiphilic biomarkers can present a challenge because they tend to adhere to surfaces, including the plastics and membranes that make up a typical microfluidic system. The disclosed microfluidic devices advantageously minimize such adherence by utilizing materials (e.g., polyimide, acrylic, polycarbonate, and other amphiphilic compatible materials) that are compatible with amphiphilic signatures, thereby minimizing adherence of amphiphilic biomarkers to the microfluidic device. Further, the use of hydrophilic polycarbonate membranes (e.g., incorporated into the microfluidic device via additive manufacturing) allows for the retention of hydrophobic lipids more effectively than was previously possible using conventional architectures.

In some embodiments, the microfluidic device can also include one or more coatings (e.g., applied within the separation units and/or to the membrane). The coatings can minimize and/or promote adherence of selected molecules (e.g., in some embodiments coatings can be used to minimize adherence of amphiphilic molecules). Such coatings can be added to the device using, for example, additive manufacturing techniques. In some particular embodiments, coatings can comprise, for example, polyvinyl alcohol, polyvinylpyrrolidone, silicone, and/or silicon.

Figure 1:
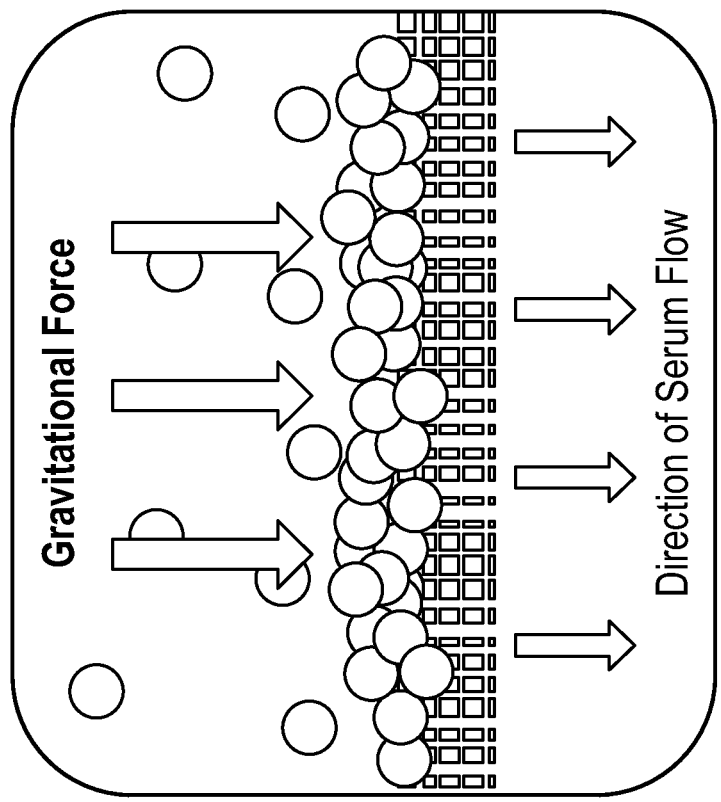
FIG. 1 illustrates a dead-end filtration device, according to one embodiment.

Centrifugal microfluidic devices can be used for a variety of processes, including biological assays and sample preparation. Some types of filtration devices use dead-end filtration, as shown in FIG. 1. Dead-end filtration can result in clumping of residue or particles (e.g., red blood cells) which can clog the filter and prevent passage of the filtrate. In contrast, the disclosed microfluidic devices use cross-flow filtration to separate out the selected components. As shown in FIG. 2, in cross-flow filtration, centrifugal force (as represented by arrow 10) is used to pass the sample 12 tangentially (e.g., toward the radially outer edge of the device) across a filter or membrane 14. In certain embodiments, the filtration device can be rotated to generate the centrifugal force. Centrifugal force can be particularly effective for density-based separations (such as the extraction of serum from blood, which is essentially a phase separation). Filtrate (e.g., serum) smaller than the membrane's pores is driven through the filter 14 as pressure increases due to the centrifugal force applied to the sealed/closed microfluidic system, and larger components (e.g., residue) pass over the membrane surface. Cross-flow filtration advantageously mitigates the risk of clogging because the residue does not remain on the membrane surface. This can decrease the chances of red blood cell lysis. Lysis of red blood cells can release hemoglobin (a fluorescent molecule), which can interfere with fluorescence-based detection methods.

Figure 3:
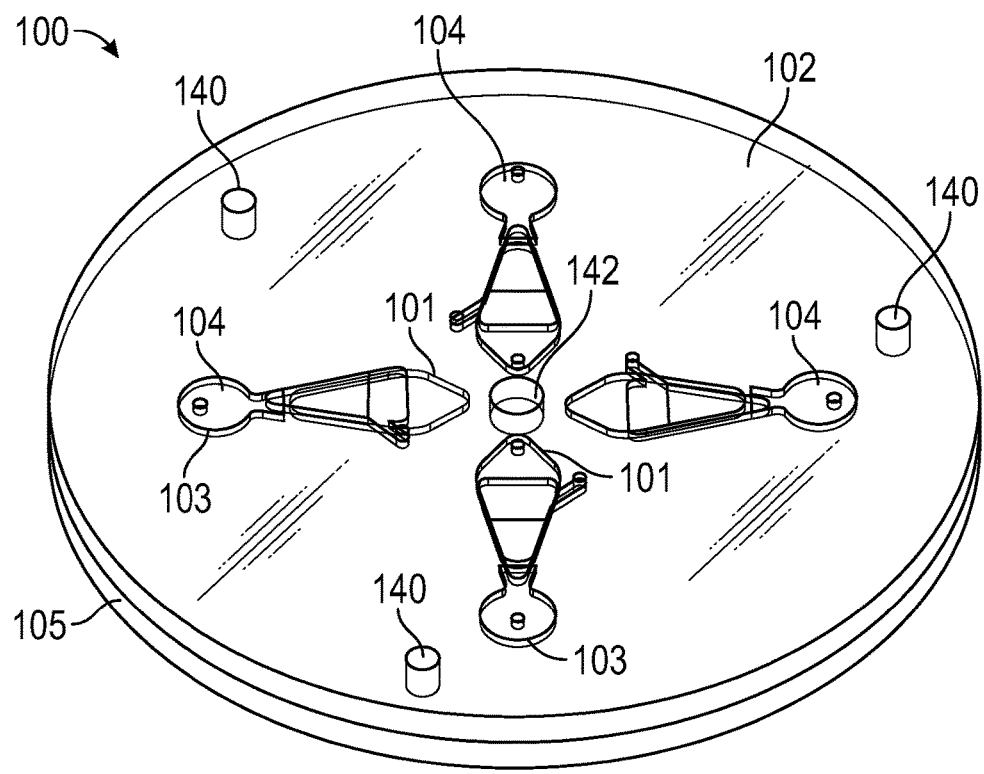
FIG. 3 is a perspective view of a microfluidic device, according to one embodiment.

FIG. 3 illustrates an exemplary microfluidic cross-filtration assembly/device or chip 100. The device 100 can comprise a body 102 in the form of a circular disk, and including a plurality of separation units 104 circumferentially arrayed around the body. The multiple separation units 104 can enable multiple simultaneous experiments on one chip, which can be used for various assays or replicates of the same sample. Though the illustrated embodiment shows four separation units 104, in other embodiments the device 100 can comprise a greater or fewer number of separation units. The device 100 can be configured to be inserted into a centrifuge such that the device can be rotated about a rotation axis extending through the center of the device (e.g., through opening 142). For example, the device 100 can comprise a central opening 142 configured to fit over the rotor of the centrifuge.

Figure 4:
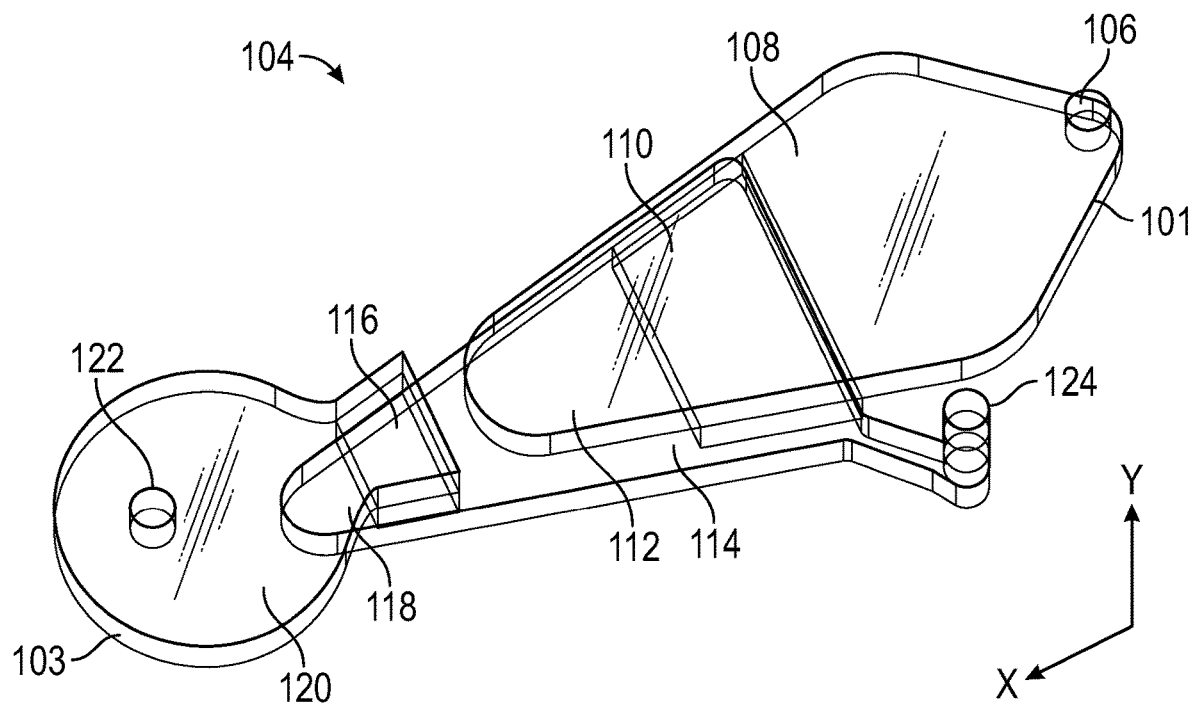
FIG. 4 is a perspective view of an exemplary separation unit of the microfluidic device of FIG. 3.
Figure 6:
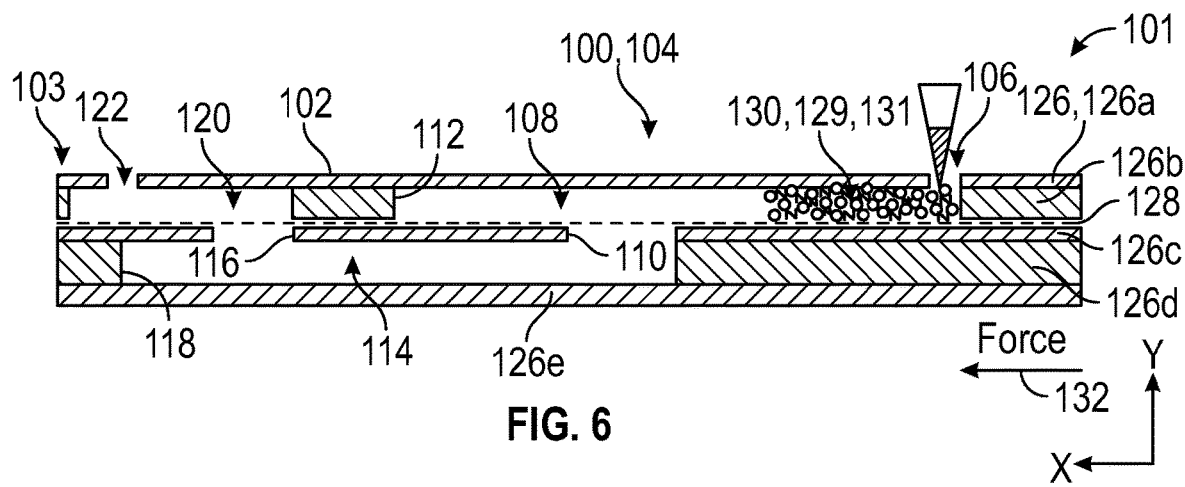
FIGS. 6-8 are cross-sectional side views of the separation unit of FIG. 4.

FIG. 4 illustrates an exemplary separation unit 104 in isolation. The separation unit 104 can include an inlet port 106, a first chamber or reservoir 108, a first opening or membrane window 110, a first trap chamber or pellet trap 112 disposed downstream of the membrane window 110, a second chamber or reservoir 114, a second opening or membrane window 116, a second trap chamber or pellet trap 118 disposed downstream of the second membrane window 116, and a third chamber or reservoir 120 including an outlet port 122. Referring to FIG. 6, the separation unit 104 can comprise a stacked device such that the first reservoir 108 is axially offset from the second reservoir along a first axis or thickness axis of the microfluidic device (e.g., the y-axis in FIG. 6). Thus, the first reservoir 108 can be above the second reservoir 114 in the orientation shown in FIG. 4. The third reservoir 120 can be axially offset from the second reservoir 114 along the first axis or thickness of the microfluidic device (e.g., along the y-axis in FIG. 6). For example, the third reservoir 120 can be above the second reservoir 114 in the orientation shown in FIG. 4. In some embodiments, such as the illustrated embodiment, the first and third reservoirs 108, 120 can be disposed within the same plane and offset from each other along a second axis or longitudinal axis (e.g., the x-axis), which can correspond to the radial direction relative to the disk 102. Thus, in embodiments where the second reservoir 114 is positioned beneath the first and third reservoirs 108, 120, the second reservoir can overlap with the first reservoir and with the third reservoir in the radial direction (e.g., along the x-axis in FIG. 6).

In the illustrated embodiment, as shown in FIG. 6, the reservoirs 108, 114, and 120 are defined by a plurality of stacked microfluidic substrates (e.g., a plurality of substrate layers 126a-126c). For example, the first and third reservoirs 108, 120 can be defined by substrate layers 126a-126c, and the second reservoir 114 can be defined by substrate layers 126c-126e. However, in other embodiments, the third reservoir 120 can be below the second reservoir 114, for example, defined by additional stacked microfluidic substrates. Each separation unit 104 can have a radially inner end 101 (e.g., relative to the disk 102, where the radially inner end 101 is disposed adjacent the opening 142) and a radially outer end 103 disposed adjacent an outer edge 105 (FIG. 3) of the device 100. The second reservoir 114 can extend radially outwardly past the first membrane window 110 (along the positive x-axis in FIG. 6). The third reservoir 120 can extend radially outwardly past the second membrane window 116.

Referring to FIG. 4, in some embodiments, the separation unit 104 can further include a vent 124 coupled to the first and/or second reservoirs. In certain embodiments, the vent 124 can be a duct in communication with the chamber 108, the chamber 114, and/or the chamber 120, and can allow gases (e.g., air) to flow out of the chambers during, for example, introduction of a sample liquid to be filtered. After the separation process is complete, a user can open vent 124 (e.g., by poking a hole through the sticker layer or removing the layer) to allow for the addition/removal of samples. Such a configuration can allow for the removal of the sample from an otherwise scaled chamber, and/or can allow for the addition of samples without interferents (e.g., air bubbles entrained in the sample).

Though the embodiment illustrated in FIGS. 3-8 shows two membrane windows and two pellet traps per separation unit 104, in other embodiments each separation unit 104 can comprise a greater or fewer number of membranes, membrane windows, and/or pellet traps depending on the desired purity of the filtrate and/or the selected processing steps.

Figure 5:
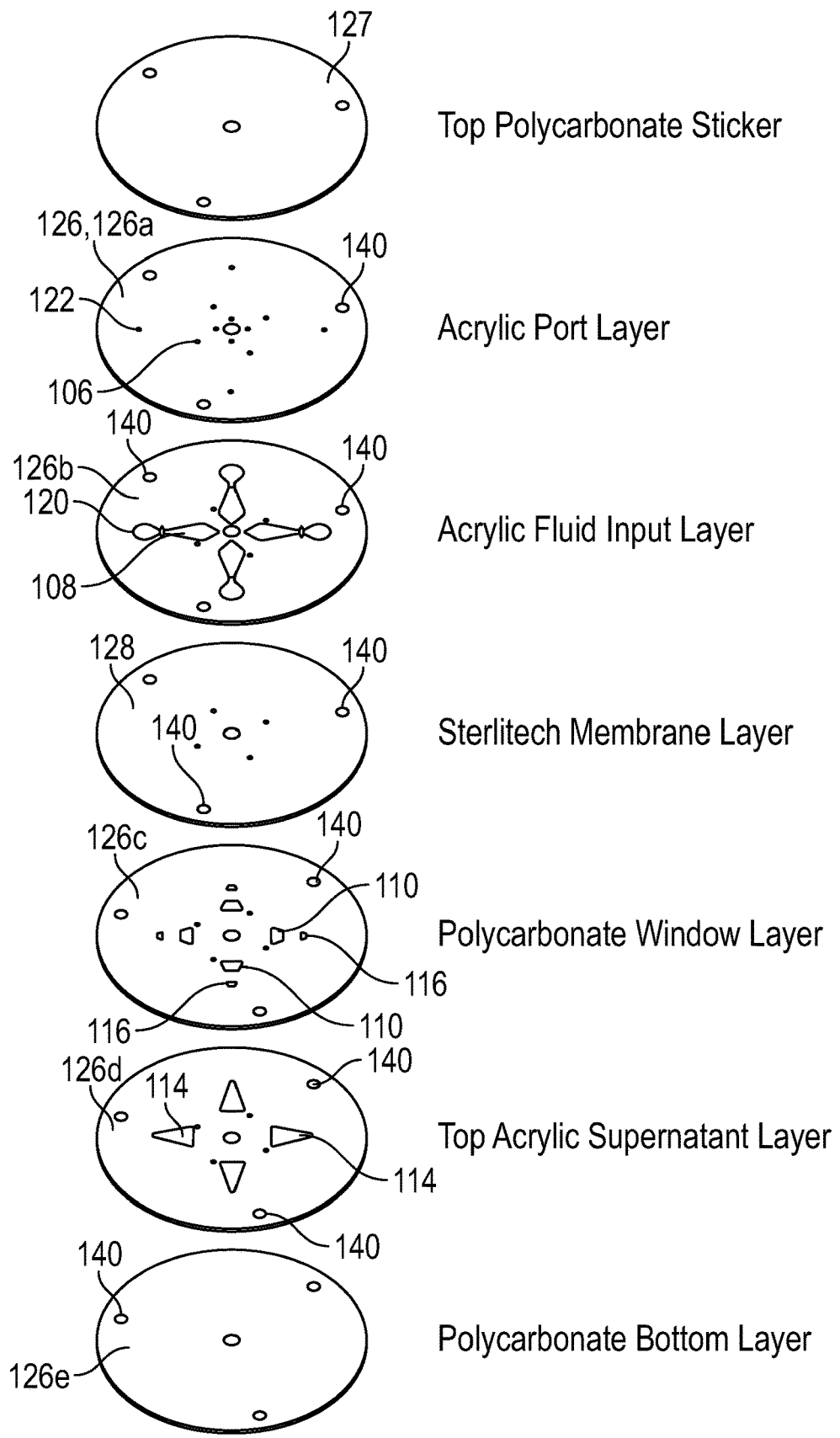
FIG. 5 is an exploded perspective view of the microfluidic device of FIG. 3.

Referring now to FIG. 5, the body 102 of the device 100 can comprise various layers defining multiple chambers forming multiple separation units 104. For example, in the illustrated embodiment, the device 100 can comprise a plurality of substrate layers 126 (e.g., five in the illustrated embodiment) (e.g., made of acrylic/plastic) and a membrane layer 128. However, in other embodiments, the device 100 can comprise a greater or fewer number of support and/or membrane layers. In the following description features of a representative separation unit 104 are indicated for case of illustration, and each substrate can include a number of such features corresponding to the number of separation units 104 in the device. The substrate layers 126 can comprise a port layer 126a, which can include openings configured as inlet and outlet ports, such as exemplary inlet port 106 and exemplary outlet port 122. The device can further include a fluid input or reservoir layer 126b comprising one or more reservoirs/chambers (e.g., the first and third chambers 108, 120), a window layer 126c including openings configured as membrane windows 110, 116, a supernatant layer 126d comprising one or more chambers (e.g., the second chamber 114), and a bottom layer 126e. In the embodiment shown in FIGS. 5-8, the membrane layer 128 can be disposed between the fluid input layer 126b and the window layer 126c. However, in other embodiments, the membrane layer 128 can be positioned between, above, or below any of the substrate layers 126. In some embodiments, as shown in FIG. 5, the device 100 can further comprise an upper seal layer 127, which can be, for example, an adhesive layer such as a polycarbonate sticker. The sticker layer 127 can be applied to the device 100 after a sample has been disposed within the separation unit 104 to seal the inlet and/or outlet ports 106, 122 during the filtration process. In some embodiments, substrate layers 126a, 126b and 126d can be formed from acrylic, and substrate layers 126c and 126e can be formed from polycarbonate, although any suitable materials can be used.

In certain embodiments, the membrane layer 128 can comprise a hydrophilic polymeric material with pores of a specified size. As used herein, the term "hydrophilic" refers to a material wherein a water droplet on a surface of the material forms a contact angle of less than 90°, which indicates that the material has an affinity for water. For example, in some particular embodiments, the membrane layer 128 can comprise track-etched hydrophilic polycarbonate with 5 µm pores. In other embodiments, the membrane 128 can comprise, for example, PET, PETE, polyester, PEEK, PTFE, polyamides, regenerated cellulose membrane, nylon, etc. depending on the selected molecules to be retained/filtered using the microfluidic device. For example, PTFE (e.g., Teflon) membranes are hydrophobic and oleo-resistant and can therefore be used to repel lipids. Such membranes can comprise pore sizes of, for example, from 3 µm to 8 µm. If the microfluidic device is being used to retain proteins, a regenerated cellulose membrane can be used (for example, with a pore size less than that of the PTFE membrane). If the microfluidic device is being used to retain nucleic acids, the membrane can comprise nylon. In micro-fluidic devices that perform multi-stage separation, separation units can comprise membranes made of different materials. For example, in some embodiments, the membrane layer 128 can comprise multiple materials such that each separation unit (or each window within a single separation unit) can comprise a different membrane material.

In certain embodiments, the membrane pore size can be from 1 µm to 20 µm such as from 1 µm to 15 µm, 3 µm to 10 µm, from 3 µm to 6 µm, etc. In certain embodiments, the pore size can be selected to prevent passage of red blood cells or the like through the membrane. The membrane layer 128 can be coated with polyvinylpyrrolidone (PVP) to enhance hydrophilicity. In some embodiments, the membrane layer 128 can be between 3-24 µm thick. The device 100 can integrate suspended membrane layers that are flat using, for example, the method of membrane integration described below. Such a method can advantageously produce a membrane surface that is free or substantially free from visible indentations or imperfections.

In some embodiments, the device 100 can be fabricated using additive manufacturing techniques (also referred to as three-dimensional printing) in which any of various materials (e.g., plastic, metal, glass, etc.) is deposited in layers to form a three-dimensional object including the chambers, openings, vents, coatings, membranes, etc., described herein.

Figure 15A:
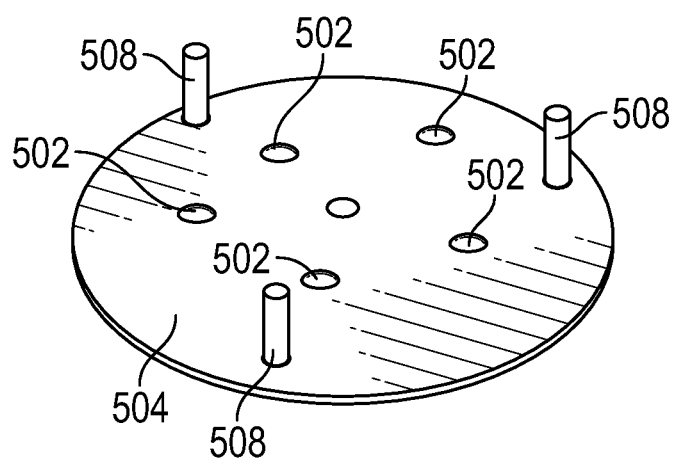
FIGS. 15A-15D are perspective views of components of a microfluidic device, according to one embodiment.
Figure 15B:
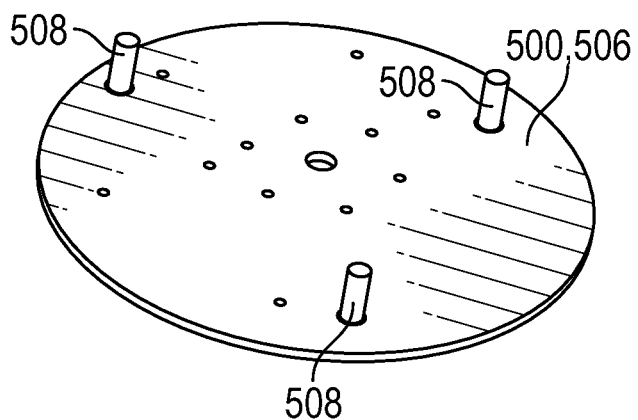
Figure 15C:
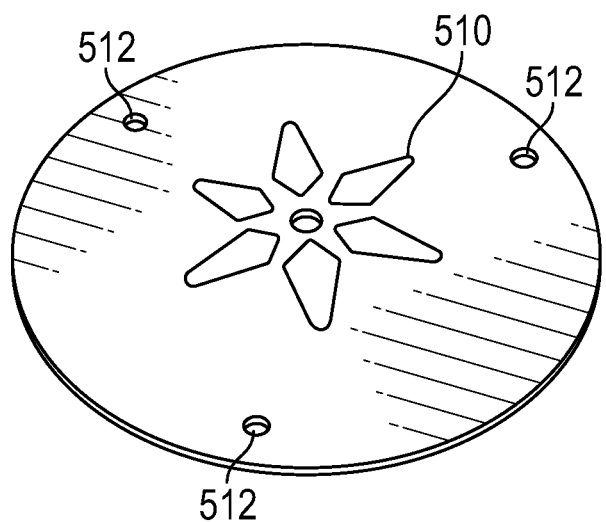
Figure 15D:
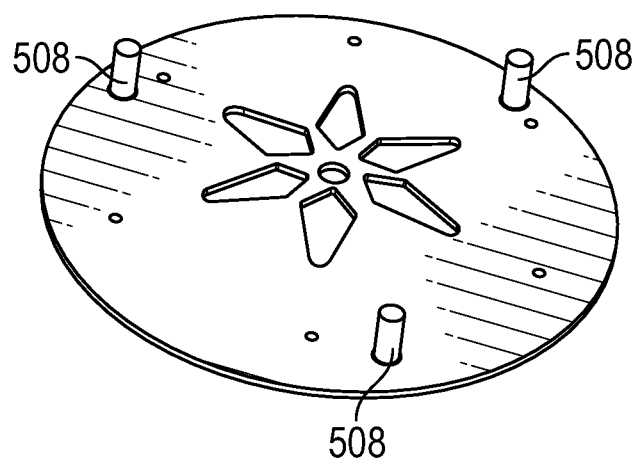

Referring to FIGS. 15A-15D, an exemplary method of membrane integration can proceed as follows. To incorporate a membrane layer 500 (e.g., similar to membrane layer 128) into a microfluidic device, such as microfluidic device 100, drops 502 of distilled water (e.g., 6-9 drops) can be pushed through a syringe filter onto the clean acrylic surface of a jig 504 (e.g., similar to a support layer 126), as shown in FIG. 15A. As shown in FIG. 15B, the membrane sheet 500 (including a protective top layer 506) can be gently placed down onto the clean surface. Since the membrane 500 can be hydrophilic, it can be pulled onto the surface by the water through adhesion, causing it to lay flat. The protective layer 506 can be gently removed without disturbing the membrane underneath. The membrane 500 can be left to dry (e.g., for about 5 to 10 minutes at room temperature) to evaporate any excess water, though a slight amount of moisture underneath the membrane is desired to keep the membrane in place. Each layer (e.g., jig 504, membrane 500, and/or protective layer 506) can comprise openings 512 (FIG. 15C) through which one or more posts 508 can extend, e.g., to prevent the layers from rotating relative to one another while drying. As shown in FIG. 15C, the next layer 510 (e.g., a support layer similar to support layer 126) of the device can then placed on top of the membrane 500, glue-side down, bonding the two layers with a pressure-sensitive adhesive. The rest of the acrylic and polycarbonate layers can then be added, as shown in FIG. 15D, using a jig and can be fully bonded with a hand roller as necessary.

In some particular embodiments, the device 100 can be fabricated using a rapid prototyping method which uses laser-based micropatterning and lamination. In some embodiments, a pressure-sensitive adhesive, such as adhesive tape (e.g., 3M™ Silicone Tape 91022), can be used to facilitate the lamination process. A $CO_2$ laser cutter (e.g., Universal Laser System's M-360 Laser Cutter) can be used to cut the substrate layers and/or membrane layers. The substrate layers 126 can be cut from stock cast acrylic and/or polycarbonate, and the membrane layer 128 can be cut from a membrane sheet. Once cut, the layers can be cleaned using bath sonication in water with dish soap for, for example, fifteen minutes followed by manual wash, for example, wiping with isopropyl alcohol. The support and/or membrane layers 126, 128 can comprise alignment holes 140 (FIG. 5) such that the layers can be aligned with one another for device on a jig.

Figure 7:
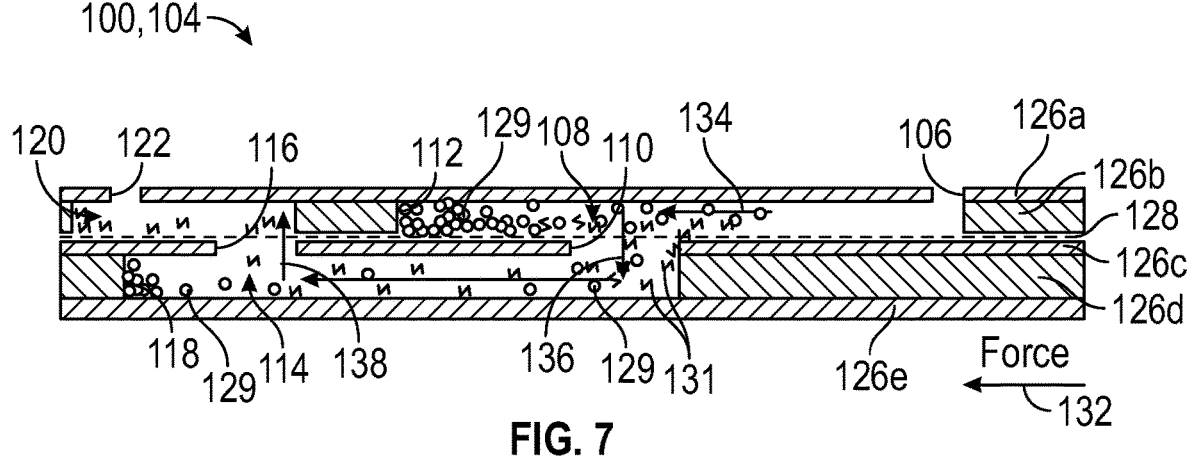

Referring again to FIGS. 6-8, a separation unit 104 of microfluidic device 100 can be used in the following exemplary manner. A sample 130 (e.g., whole blood) containing a desired filtrate (e.g., serum 131 containing lipid-bound biomarkers) can be disposed in the first chamber 108 via the inlet port 106. The ports (e.g., inlet port 106 and outlet port 122) can be sealed (e.g., using a sticker layer 127), and a centrifugal force can be applied to the device 100 at a selected rotational speed/revolutions per minute (RPM) in the direction shown by arrow 132. For example, when processing certain blood samples the device 100 can be spun at 4500 RPM for 3 minutes. The centrifugal force 132 can cause the sample 130 to flow away from the center of rotation, e.g., tangentially across the membrane layer 128, as represented by arrow 134 (FIG. 7). As shown in FIG. 7, the residue (e.g., red blood cells 129) flows across the membrane layer 128 mostly without passing through (e.g., due to the particle size and membrane pore size), and clusters toward the bottom of the first chamber 108 in the first pellet trap 112 due to the density of the residue particles.

The first pellet trap 112 can be configured (e.g., sized and shaped) such that the volume of the pellet trap corresponds to the volume of residue 129 (FIG. 6) e.g., red blood cells, in a selected sample volume. In other words, the volume of residue 129 can fill or substantially fill the volume of the pellet trap 112 such that the filtrate 131 (FIG. 6) e.g., serum, is aligned with (e.g., positioned over) the opening 110. Such a configuration advantageously positions the filtrate 131 radially inwardly of the pellet trap 112 and on the membrane 128 to facilitate flow through the membrane 128 (e.g., aided by gravity, capillary action, and/or a pressure differential across the membrane during centrifugation). In some embodiments, the second pellet trap 118 can be similarly configured to position or displace the desired filtrate radially inwardly of the pellet trap 118 to align with the second window 116 and membrane.

Figure 8:
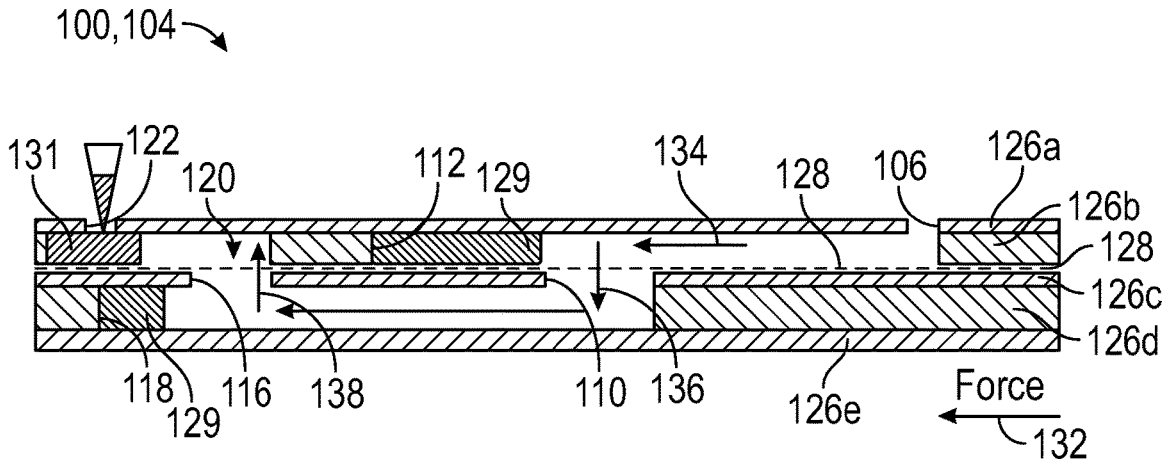

Referring to FIG. 7, as the centrifugal force 132 pushes the residue (e.g., red blood cells 129) into the pellet trap (e.g., increasing pressure against the outer wall of the first chamber 108) the filtrate or supernatant (e.g., serum 131) flows through the membrane layer 128 at the first membrane window 110 and into the second chamber 114, as represented by arrow 136. As shown, a small amount of residue (e.g., red blood cells 129) may pass through the membrane layer 128 at the first membrane window 110 and enter the second chamber 114. The residue that enters the second chamber 114 can be caught in the second pellet trap 118, and the filtrate/serum 131 can flow through the membrane layer 128 at the second membrane window 116, as represented by arrow 138. Referring to FIG. 8, once the filtrate/serum 131 is disposed within the third chamber 120, it can be collected through the outlet 122 (e.g., with a pipette or syringe).

In other embodiments, the separation unit 104 can comprise only a single pellet trap and only a single membrane window, or more than two membrane windows and corresponding chambers/pellet traps, depending on the type of sample, the size of the particles to be filtered, and the pore size of the membrane. In certain embodiments, the different membranes of the separation unit 104 can comprise different pore sizes. For example, in certain embodiments the first membrane can have a relatively larger pore size than the second membrane such that the first membrane filters relatively larger or coarser particles and the second membrane filters relatively smaller or finer particles.

Figure 20:
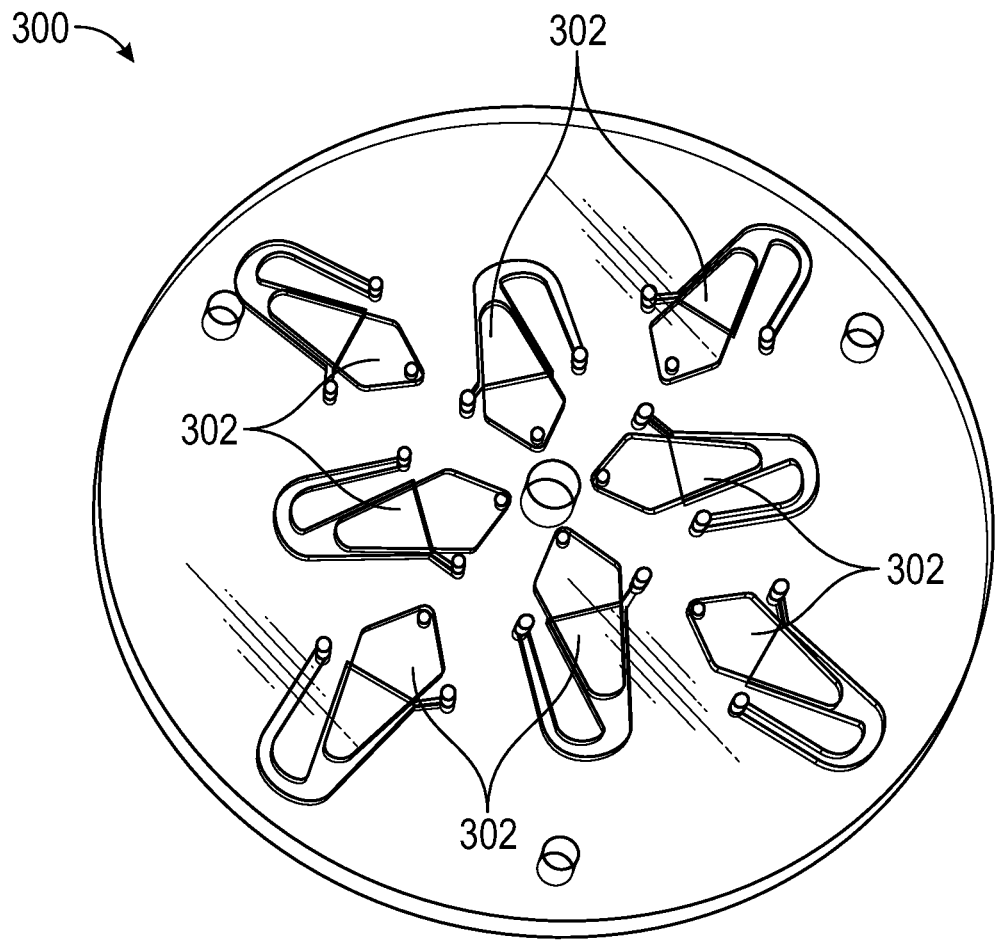
FIG. 20 is a perspective view of a microfluidic device, according to another embodiment.

The multiple separation units 104 of the microfluidic device 100 can be used to perform multiple simultaneous experiments on a single microfluidic device (e.g., various assays) and/or can be used to perform replicates of the same sample. In some embodiments, for example, as shown in FIG. 20, a microfluidic device 300 can comprise eight separation units 302. Similar to microfluidic device 100, microfluidic device 300 can comprise five substrate layers 304 and a membrane layer 306, as shown in FIGS. 21A-21F. The substrate layers 304 can comprise a port layer 304a, which can include openings 308 configured as inlet and outlet ports, a fluid input or reservoir layer 304b comprising one or more chambers 310, a window layer 304c including openings 312 configured as membrane windows, a supernatant collection layer 304d comprising one or more chambers 314, and a bottom layer 304e. Each layer can comprise a central opening 316 (similar to central opening 142 described previously) to fit over the rotor of a centrifuge, and a plurality of alignment holes 318 such that the layers can be aligned with one another for device on a jig.

Figure 9:
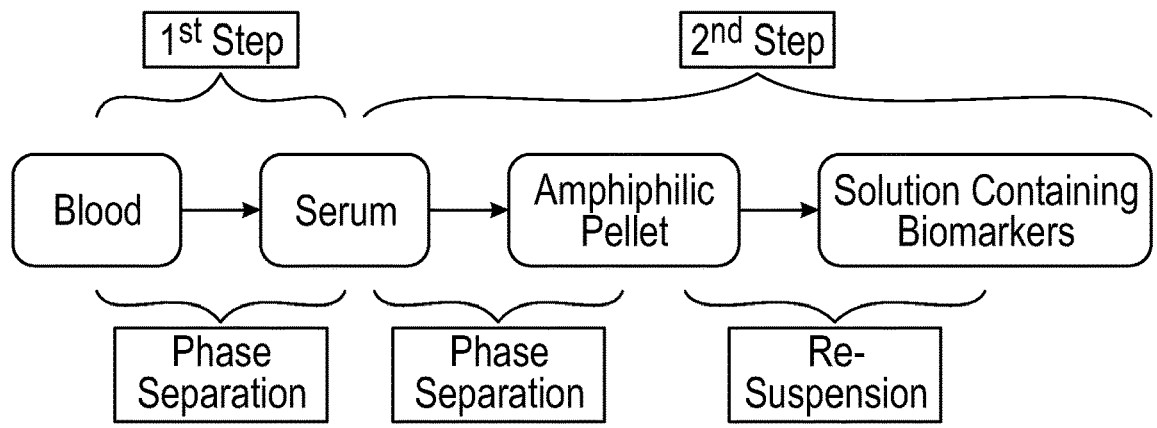
FIG. 9 illustrates an exemplary method for separation of biomarkers from blood.

In some embodiments, after the initial step of filtering the serum 131 from whole blood 130, a second processing step can be performed (e.g., using the microfluidic device 100 or a different device) to separate amphiphilic material (which can be in the form of a pellet) including the selected biomarkers from the serum. As shown in FIG. 9, once the serum has been separated from the blood using a first phase separation, as described above with respect to FIGS. 6-8, the serum can undergo a second processing/filtration step (see FIGS. 12-14) to remove the amphiphilic biomarkers from the serum by forming/concentrating them into a pellet 228 (FIG. 14). A resuspension medium (e.g., in phosphate-buffered saline (PBS)) can be disposed in the sample inlet 208 to resuspend the amphiphilic material pellet 228, which can then be extracted via the outlet 215 (FIG. 11) for biomarker analysis. As shown in FIG. 9, the first phase separation (e.g., separation of serum from blood) is referred to herein as the "first step" and the second phase separation (e.g., the separation of the amphiphilic material pellet from the serum) is referred to herein as the "second step."

Figure 10:
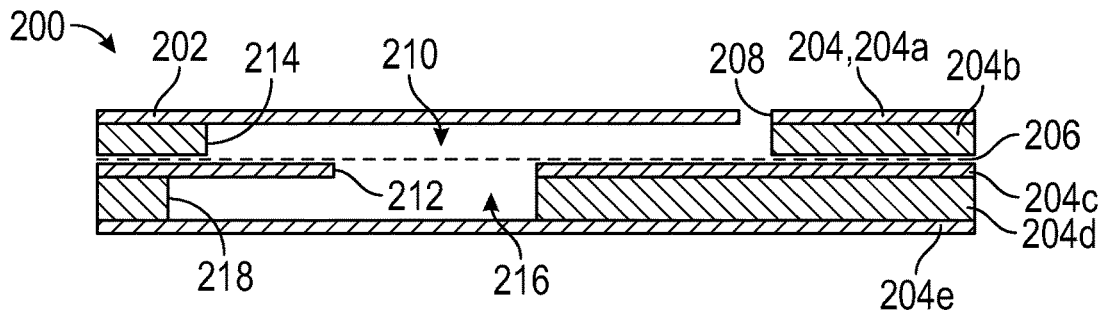
FIG. 10 is a cross-sectional side view of a separation unit, according to another embodiment.
Figure 11:
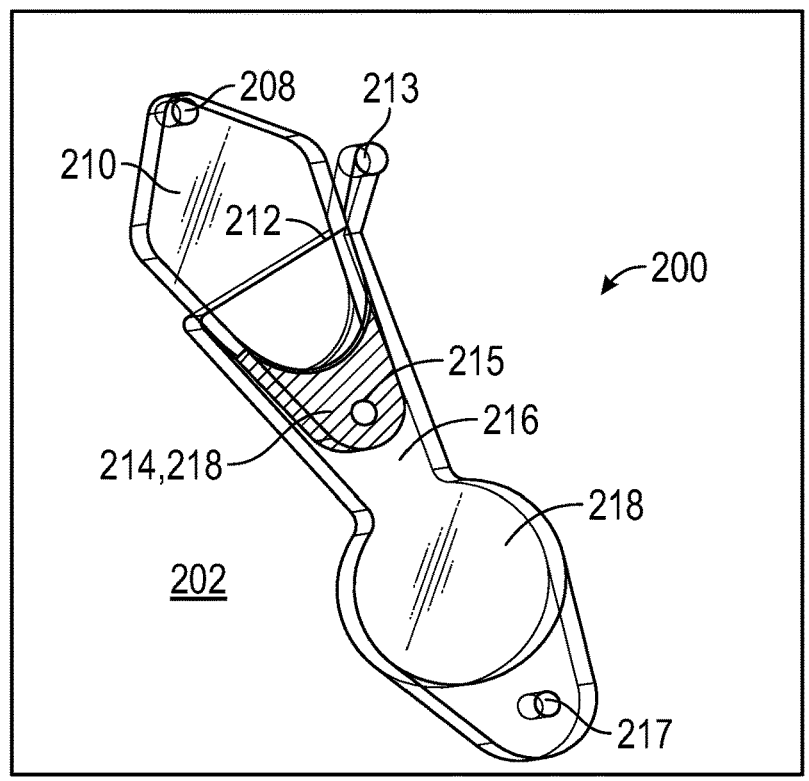
FIG. 11 is a perspective view of the separation unit of FIG. 10.

To perform the second step, the microfluidic device 100 can comprise one or more additional separation units 200. In some embodiments, the separation units 200 can be disposed on a separate body 202 (a portion of which is shown in FIG. 11). In certain embodiments, the body 202 can be a circular disk similar to the body 102. In other embodiments, the additional separation units 200 can be disposed on the same body 102 as the separation units 104. FIG. 10 illustrates a cross-section of an exemplary separation unit 200, and FIG. 11 illustrates a perspective view.

Referring to FIG. 10, similar to separation unit 104, separation unit 200 can comprise a body 202 including five substrate layers 204a-204e and a membrane layer 206. In some examples, substrate layers 204a-204e can be similar (e.g., in structure and materials) to substrate layers 126a-126e described previously. In some embodiments, membrane layer 206 can comprise a different material than membrane layer 128.

In certain embodiments, the membrane layer 206 can comprise a hydrophilic polymeric material with pores of a specified size. For example, in some particular embodiments, the membrane can comprise a hydrophilic polyester membrane. In other particular embodiments, the membrane can comprise track-etched polyethylene terephthalate (also referred to as PET, PETE, or polyester) with 5 µm pores. In other embodiments, the membrane 206 can comprise any of the materials listed previously for membrane 128, for example, PET, PETE, polyester, PEEK, PTFE, polyamides, regenerated cellulose membrane, nylon, etc. depending on the selected molecules to be retained/filtered using the microfluidic device.

In certain embodiments, the pore size can be from 3 μm to 10 μm, for example, from 3 μm to 6 μm, or any of the pore sizes given above. The membrane layer 206 can be integrated into the body 202 using the membrane integration methods described previously with respect to FIGS. 15A-15D. The separation unit 200 can include an inlet port 208, a first chamber or reservoir 210, a membrane window 212, a first pellet trap 214, an outlet port 215 (FIG. 11), a second chamber or reservoir 216, and a second pellet trap 218. In some embodiments, the separation unit 200 can further comprise a vent 213, and/or an additional outlet port 217 fluidly connected to the second chamber 216 and/or pellet trap 218.

Figure 12:
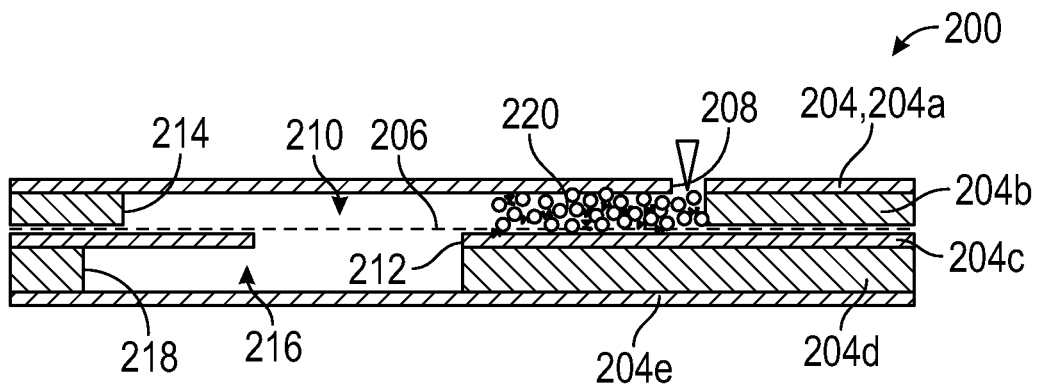
FIGS. 12-14 are cross-sectional side views of the separation unit of FIG. 10.
Figure 13:
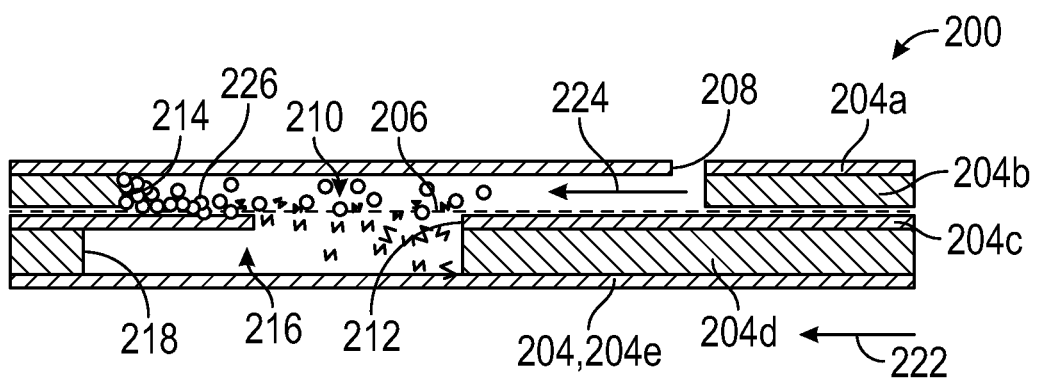
Figure 14:
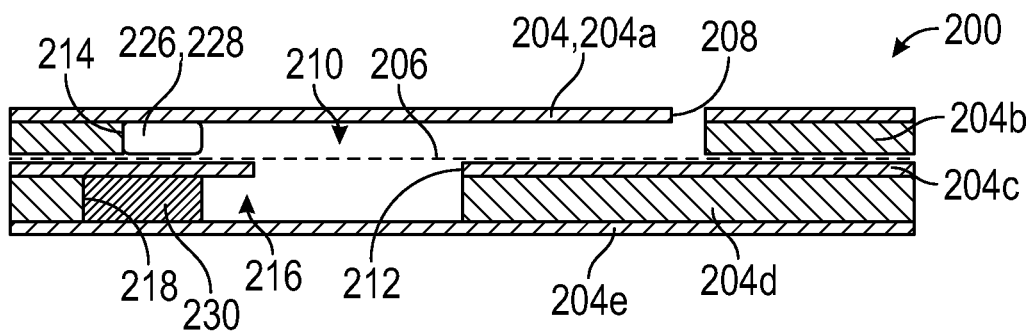

Referring to FIGS. 12-14, a separation unit 200 can be used in the following exemplary manner. A sample 220, (e.g., comprising serum including lipid-bound biomarkers with added methanol and/or chloroform), can be disposed in the first chamber 210 via the inlet port 208. The methanol/chloroform can separate the lipid-bound biomarkers from their lipid carriers (e.g., HDL/LDL) and also from any surrounding carbohydrates and/or proteins (which associate with the methanol) that can exist in the serum. The port (e.g., inlet port 208) can be sealed (e.g., using a sticker layer such as sticker layer 127), and a centrifugal force can be applied to the separation unit 200 at a selected revolutions per minute (RPM). For example, the separation unit can be spun at 5500 RPM for 1 minute. Referring to FIG. 13, the centrifugal force, represented by arrow 222, can cause the sample 220 to flow away from the center of rotation, e.g., tangentially across the membrane layer 206, as represented by arrow 224. As shown, the biomarkers flow across the membrane layer 206 without passing through, due to their size, and cluster toward the bottom of the first chamber 210 in the first pellet trap 214, forming an amphiphilic material pellet 228.

As pressure increases in the first chamber 210 (e.g., due to centrifugal force 222), the supernatant 230 (e.g., waste serum, waste lipids/carbohydrates/proteins, and/or chloroform/methanol) can flow through the membrane layer 206 at the membrane window 212 into the second chamber 216. The supernatant 230 that enters the second chamber 216 can be caught in the second pellet trap 218. A resuspension medium (e.g., PBS) can be disposed in the sample inlet 208 to resuspend the amphiphilic material pellet 228, which can then be extracted via the outlet 215 (FIG. 11) for biomarker analysis. For example, the biomarkers can be analyzed using a waveguide-based assay, as described in Example 2 below.

The microfluidic assemblies described herein provide various advantages. For example, the microfluidic device can function using 90 μL of whole blood or less, thereby reducing invasiveness and mitigating fluid loss, which can be advantageous for use with dehydrated and/or anemic patients at the point of care. Known blood separation devices typically use linear architectures (e.g., long narrow channels), which can result in blood coagulation (which is more prevalent in smaller samples of blood; often requiring the dilution of whole blood before separation can occur). Such known devices can have separation efficiency less than that of the devices described herein, meaning that known devices require larger volumes of blood to achieve similar outcomes. The use of cross-flow filtration in the disclosed devices (as well as the overall configuration of the device(s) and the disclosed materials and coatings) prevents or mitigates coagulation, provides a sufficiently large window to allow flow-through of the filtrate, and provides a repository for collection that ensure significant sensitivity of measurement (e.g., a specified measurement sensitivity).

In some embodiments, the first chamber/reservoir 108 can have a length, width, depth, etc. such that the volume of the chamber is 100 μL or less. For example, 90 μL or less, 80 μL or less, 70 μL or less, 60 μL or less, 50 μL or less, 40 μL or less, 30 μL or less, etc. Accordingly, the microfluidic device can be scalable to various volumes, depending on patient need and the selected assay(s) to be performed. The use of hydrophilic and/or oleoresistant coatings can also promote scalability and/or reduce the volume of the blood sample by reducing liquid and/or analyte retention in the device. The microfluidic assemblies described herein can offer reduced manufacturing complexity, are disposable, and need not rely on pumps or valves for fluidic movement. Further, separations performed on such assemblies do not interfere with amphiphile detection, nor do they require dilution of the whole blood sample. Such assemblies do not interfere with amphiphile detection as validated using optical biosensors, nor do they necessitate the dilution of blood samples.

The microfluidic assemblies and processes described herein can be used to isolate any of a variety of amphiphilic materials and/or biomarkers associated with a variety of classes of bacteria and/or bacterial species. For example, the assemblies and processes described herein can be used to filter and concentrate lipoarabinomannan (LAM), a biomarker associated with Gram-indeterminate bacteria such as *Myobacterium tuberculosis, Myobacterium bovis*, and others, lipopolysaccharide (LPS), a biomarker associated with Gram-negative bacteria such as *Salmonella Typhimurium, E. coli, Fransicella tularensis*, and others. The devices described herein can also be used to filter and concentrate biomarkers associated with gram-positive bacteria, such as lipoteichoic acid (LTA), a biomarker associated with Gram-positive bacteria including *Streptococcus pneumonia* and *Staphylococcus aureus*, and others.

The assemblies themselves can be modular, with a greater or fewer number of pellet traps, membrane windows, or separation units added or removed as needed for specific filtration processes. The design can advantageously be modified to accommodate various phase separation applications without changing the manufacturing process. The disclosed assemblies can automate sample processing at the point of care, whether for bacterial biomarkers or other lipidic signatures. Such assemblies can be used for the complete automation of sample processing at the point-of-care, whether for bacterial biomarkers or other lipidic signatures.

Figure 22:
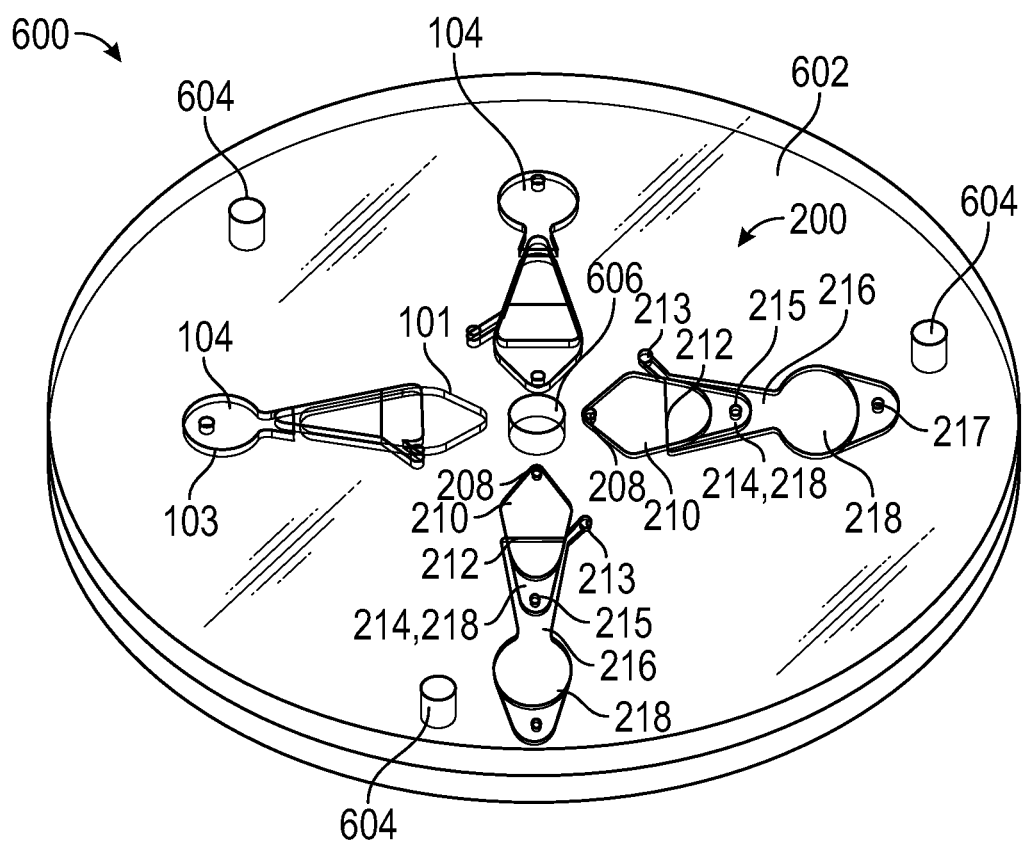
FIG. 22 is a perspective view of a microfluidic device, according to another embodiment.

Referring to FIG. 22, in some embodiments, a microfluidic device 600 can comprise one or more first separation units (e.g., separation units 104 described previously) and one or more second separation units (e.g., separation units 200 described previously) disposed on the same device body 602. In such embodiments, a user can, for example, use the first separation units 104 to perform the first step of an assay and the second separation units to perform the second step of an assay. Such steps can be performed sequentially or simultaneously. The microfluidic device 600 can be similar to microfluidic device 100 (e.g., comprising a plurality of layers forming the body and/or a body made using additive manufacturing techniques, optional alignment holes 604, and a central opening 606 to fit over the rotor of the centrifuge.

Though the illustrated embodiment shows four separation units, two of which are first separation units 104 and two of which are second separation units 200, in other embodiments the device 600 can comprise a greater or fewer number of separation units, any number of which can be first separation units 104 and any number of which can be second separation units 200. The separation units can be disposed in any pattern. In some embodiments, more than two types of separation units can be disposed on a single chip. For example, three, four, five, six, seven, eight, nine, ten, or more different types of separation units can be disposed on a single chip.

In some embodiments, the membrane layer of the microfluidic device 600 can comprise multiple materials such that the first separation units 104 contain a portion of the membrane layer comprising a different material than the portion of the membrane layer contained by the second separation units 200. For example, in the illustrated embodiment, the first separation units 104 are disposed on a first half of the body 602 and the second separation units 200 are disposed on a second half of the body. The membrane layer can comprise first and second halves such that the first separation units 104 contain a first half of the membrane comprising a first material, and the second separation units 200 can contain a second half of the membrane comprising a second material. In another embodiment, the second separation units 200 can be disposed downstream (e.g., closer to a radially outer edge of the body 602) of the first separation units 104. The membrane layer can comprise concentric rings of material such that first separation units 104 contain a portion of a first membrane ring and the second separation units 200 contain a portion of a second membrane ring (e.g., the membrane layer comprises different materials, pore sizes, and/or other properties moving in a direction from the radially inner edge of the body toward the radially outer edge of the body).

The microfluidic device 600 can be used to perform a two-step assay in the following exemplary manner. A sample (e.g., whole blood) containing a desired filtrate (e.g., lipid-bound biomarkers) can be disposed within a first chamber (e.g., chamber 108, FIG. 6) of a first separation unit 104. The first separation unit 104 can be sealed (e.g., using a sticker layer similar to sticker layer 127, though in some embodiments it can be sized to only cover the first separation unit), and a centrifugal force can be applied to the device 600 at a selected rotational speed/revolutions per minute (RPM). The centrifugal force can cause the sample to flow away from the center of rotation, e.g., tangentially across the membrane layer. Separation of the residue from the filtrate can proceed as previously described for FIGS. 6-8. Once the filtrate/serum has been separated (e.g., is disposed within the third chamber 120 as shown in FIG. 8), it can be collected.

The filtrate (e.g., serum including lipid-bound biomarkers) can be combined with e.g., methanol and/or chloroform, and can be disposed in a second separation unit 200. The second separation unit 200 can be sealed (e.g., using a sticker layer similar to sticker layer 127, though in some embodiments it can be sized to only cover the second separation unit), and a centrifugal force can be applied to the device 600 by rotating the body at a selected rotational speed/revolutions per minute (RPM). The centrifugal force can cause the sample to flow away from the center of rotation, e.g., tangentially across the membrane layer. Separation of the amphiphilic biomarkers from the serum can proceed as previously described for FIGS. 12-14. As described previously, the biomarkers flow across the membrane layer without passing through, due to their size, forming an amphiphilic material pellet. A resuspension medium (e.g., PBS) can then be used to resuspend the amphiphilic material pellet, which can then be extracted from the microfluidic device 600 for biomarker analysis.

Example 1

In a particular example, the functionality of a microfluidic device 100 performing the first step (e.g., separation of serum from blood) was experimentally verified as follows.

Device functionality was verified in a series of systematic experiments that determined RPM (e.g., from 3500-5000, tested in 500 RPM increments), time (e.g., from 2-5 min, tested in 1 min increments), membrane type (e.g., polycarbonate and polyester membranes comprising 2 µm, 3 µm, and 5 µm pore sizes), and geometric design parameters (e.g., pellet trap sizes, tested in 0.5 mm height increments) for phase separations. In order to test different conditions, the device 100 was placed on a jig, and 90 µL of whole sheep's blood was pipetted into each inlet 106. The inlets 106 were designed to be the same diameter as the pipette tip in order to create a seal and prevent leakage. A one-sided polycarbonate tape or sticker 127 was aligned on top of the device 100 to seal all ports and prevent the escape of fluids during processing. A microcentrifuge (e.g., a Scilogex microcentrifuge) was used to test different RPM and time profiles. The device 100 can comprise a central hole 142 (FIG. 3) to fit over the rotor of the centrifuge, and the cap from the microcentrifuge was securely fastened over the device 100.

Serum purity (e.g., the percentage of cells removed from whole blood), was determined using a cell counter (e.g., a TC20 Automated cell counter). Cell counts from whole blood were compared to the cell counts in the serum filtered through the device 100, and serum purity (SP) was calculated using Equation 1:

$$SP = \frac{(\text{\# of cells in whole blood}) - (\text{\# of cells in serum})}{(\text{\# of cells in whole blood})} \times 100$$

The ability of the device 100 to retain biomarkers of interest was validated by comparing the efficacy of the microfluidic filtration process against the benchtop laboratory procedure. Since the bacterial biomarkers are amphiphilic in nature, comparing the microfluidic filtration device to the benchtop method ensures that the biomarkers are not retained within the plastic of the microfluidic device. The device 100 filtered serum was also compared to commercially available sheep serum (e.g., produced by ultracentrifugation).

In a particular example, the ability of the microfluidic device 100 to retain and subsequently detect lipoarabinomannan (LAM), the biomarker associated with *Myobacterium tuberculosis*, was chosen as an assessment of biomarker retention. LAM is an amphiphilic biomarker that associates with high-density lipoproteins (HDL). Once extracted, LAM was detected with a waveguide biosensor using a tailored method called membrane insertion.

In order to test the biomarker retention, whole blood was spiked with LAM to a concentration of 0.05 µM and incubated overnight at 4° C. The next day, the serum was separated from blood using either the microfluidic device 100 or by traditional benchtop separation, depending on the assay. For extractions using the microfluidic device, 90 µL blood was pipetted into each inlet hole, and the device was centrifuged at 4500 RPM for 3 minutes. This RPM and time combination was optimized as described earlier. For traditional methods, 500 µL whole blood was pipetted into a microcentrifuge tube and centrifuged at 4500 RPM for 3 minutes.

The serum from each method of separation was analyzed by cell counting, and sample processing was finished using benchtop methods. Namely, 120 µL of serum was mixed by pipetting with 150 µL chloroform and 300 µL methanol in low-retention microcentrifuge tubes. The mixture was spun at 5500 RPM for 1 minute on a microcentrifuge, and the supernatant was discarded. The amphiphilic pellet containing biomarkers of interest was re-suspended in 120 µL of 1×PBS, which was injected into the flow cell of the waveguide and incubated for 45 minutes at room temperature. After incubation, the flow cell was washed, and the specific signal was measured on the waveguide-based optical biosensor using the exemplary method described in Example 2 below.

In the example described above, step two of the filtration process (e.g., the separation of the amphiphilic lipid pellet from the serum) is performed using a benchtop method. However, in other examples step two can be performed using a microfluidic device, as described previously.

It was found that spinning the device 100 at 4500 RPM for 3 minutes yielded serum with the least amount of red blood cells remaining. Pellet trap heights of 5 mm for the first pellet trap 112 and 2 mm for the second pellet trap 118, were found to be highly effective. Passing the sample through the membrane twice (e.g., at first membrane window 110 and second membrane window 118) was found to be more effective at separating red blood cells than a single membrane pass.

Figure 16:
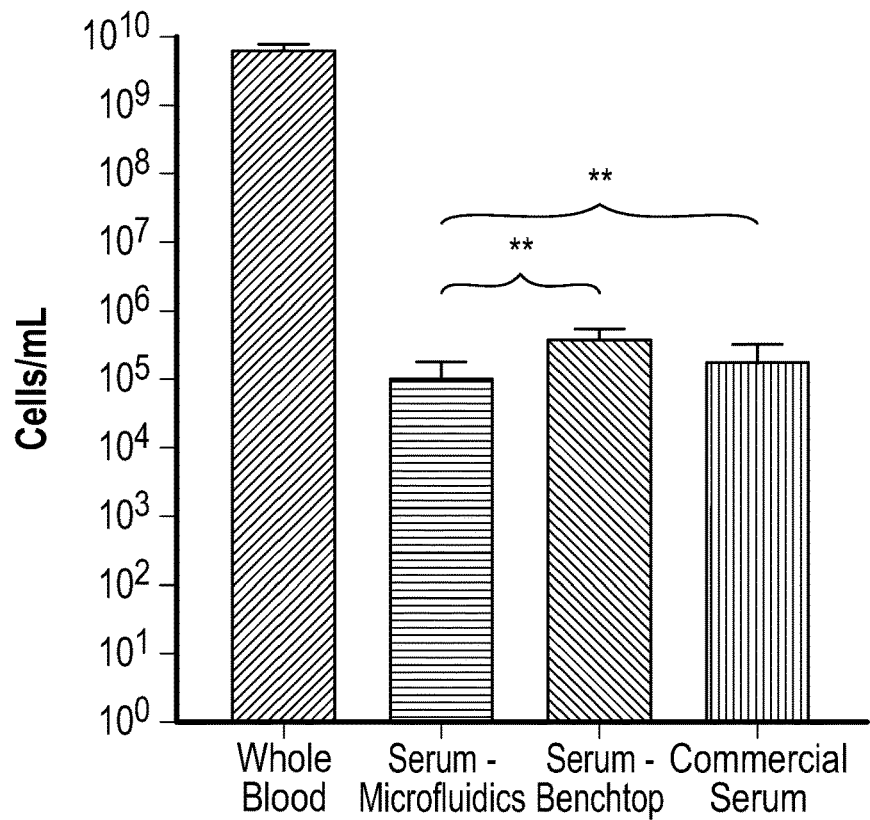
FIG. 16 is a bar chart illustrating the volume of cells in various substances.

As shown in FIG. 16, to determine serum purity, the red blood cell count (cells/mL) of serum separated on the microfluidic device 100 was compared to whole blood, serum separated by traditional centrifugation (e.g., benchtop methods), and to commercially available serum. The asterisks (**) in the figure indicate statistical significance. The average cell counts (e.g., n=3) on whole blood was $6.8 \times 10^9$ cells/mL, the average for serum processed on the microfluidic device 100 was $1.27 \times 10^5$ cells/mL, for serum processed by benchtop methods was $4.45 \times 10^5$ cells/mL, and for commercially-available serum was $1.90 \times 10^5$ cells/mL. The serum processed using the microfluidic device 100 had a statistically significantly lower cell count (P=0.0179 for microfluidics vs. benchtop; P=0.0128 for microfluidics vs. commercial serum). Serum purity was calculated for benchtop methods of separation and for the microfluidic separation. Both methods yielded a high percentage of cells removed from whole blood, greater than 99.99%. The serum processed on the microfluidic device had a lower cell count than either the serum processed using the benchtop separation method or commercially available serum, as well as a higher serum purity.

Figure 17:
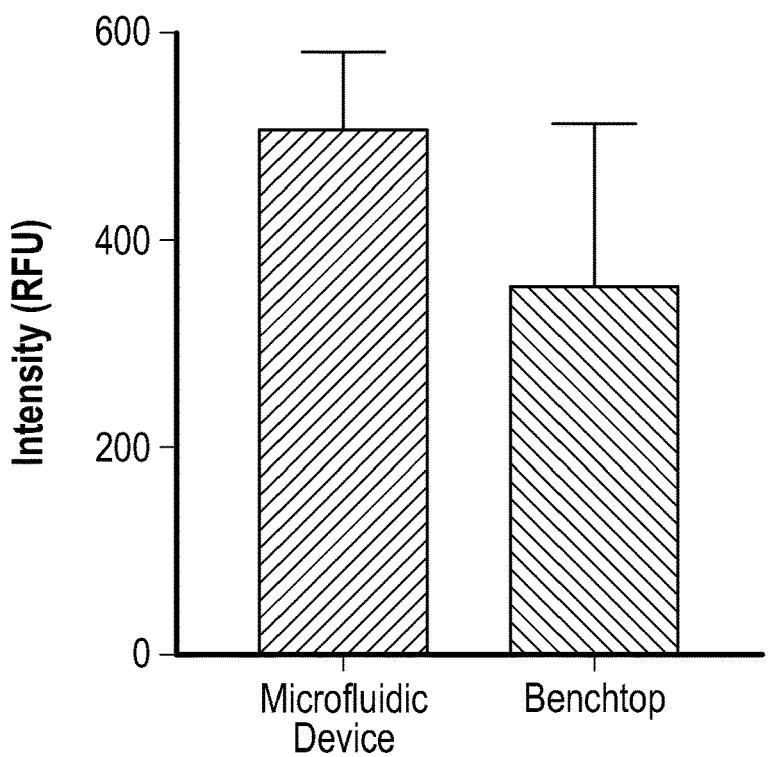
FIG. 17 is a bar chart illustrating the fluorescent intensity of biomarkers in various substances.

The filtered serum sample was further validated by testing for biomarker retention and comparing to biomarker results from the benchtop processing methods. Whole blood was spiked with LAM at 0.05 µM before separating the serum from the blood using the microfluidic device 100. Whole blood from the same aliquot was also processed using the benchtop assay. After the blood-serum separation process was performed, both sets of serum were analyzed using a waveguide-based optical biosensor (e.g., as described in Example 2). As shown in FIG. 17, the average (e.g., n=3) signal intensity (relative fluorescent units (RFUs)) of LAM in the microfluidic device-filtered sample was compared to the benchtop filtered sample. A higher intensity (e.g., higher RFU) indicates a higher concentration of biomarkers retained in the serum sample. There was no statistically significant difference between LAM levels in serum processed on the microfluidic device 100 vs. by benchtop methods (P=0.9392), indicating that our cross-flow filtration device 100 is suitable for the separation of serum from blood, and subsequent detection of amphiphilic biomarkers.

Figure 18:
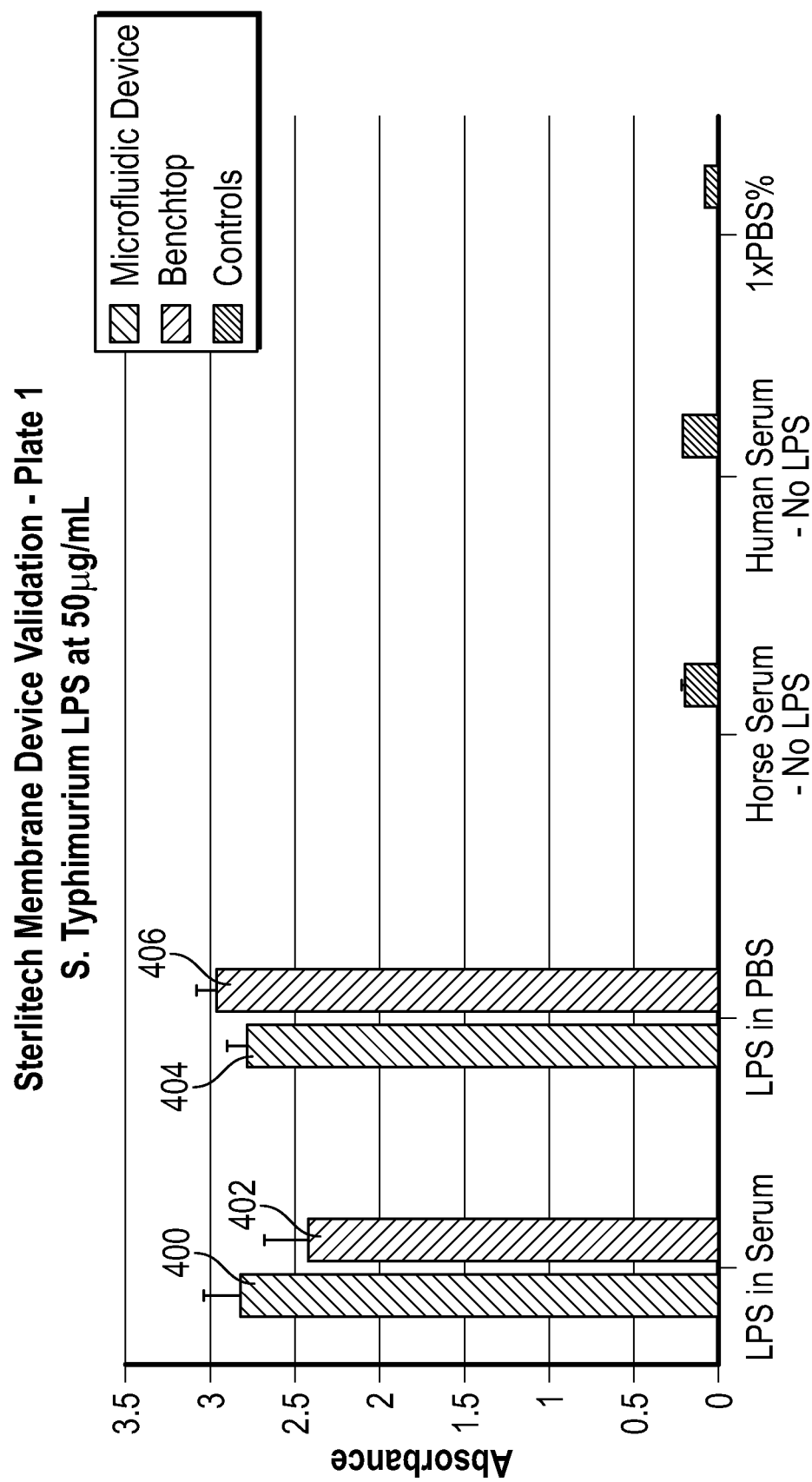
FIGS. 18-19 are bar charts illustrating the levels of biomarkers in various substances.
Figure 19:
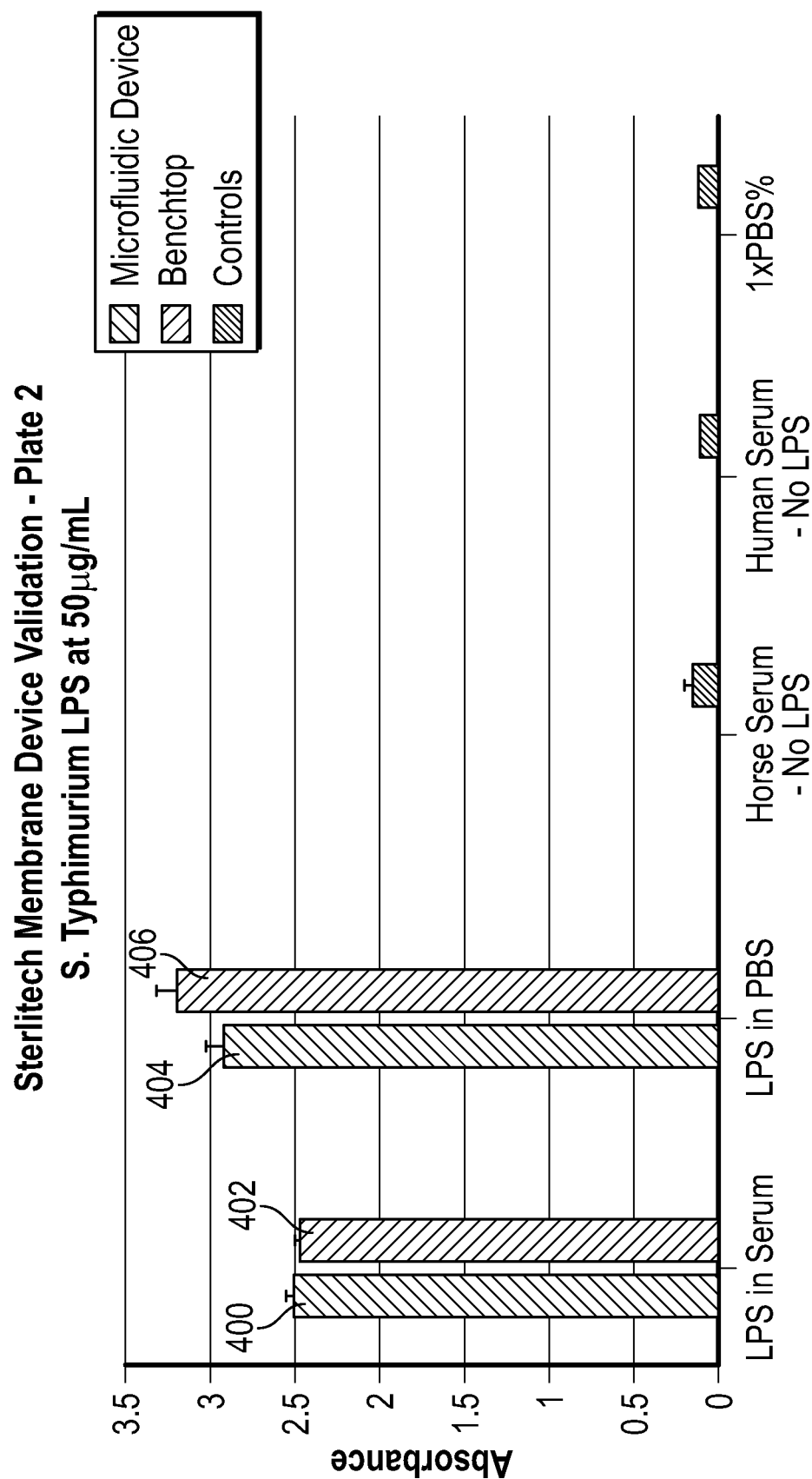

FIGS. 18-19 illustrate additional biomarker filtration results for *S. Typhimurium* LPS at 50 µg/mL concentration. As shown, in both FIG. 18 and FIG. 19 the levels of LPS biomarkers in the microfluidic device-filtered serum 400 are similar to those in the benchtop filtered serum 402, and the levels of LPS biomarkers after resuspension of the lipid pellet in PBS are similar for the microfluidic device 404 and the benchtop methods 406.

The microfluidic device 100 advantageously allows for cross-flow filtration in a centrifugal microfluidic platform to perform blood/serum separation while preserving lipidic biomarkers with the same efficiency as benchtop processing. Serum processed using the microfluidic device 100 contains fewer red blood cells than serum separated using benchtop methods or commercially available serum, and was over 99.99% pure. Further, there was no statistically significant loss of signal for detection of the model biomarker of interest, LAM, when compared to benchtop methods of separation, indicating the advantageous nature of the device for amphiphilic and lipidic signature retention.

Example 2

An exemplary waveguide-based assay for LAM retention can be performed as follows.

Planar optical waveguides with a silicon oxynitride (SiONx) film were prepared, and stock LAM (e.g., 19 kDa) was procured. Two LAM primary antibodies were provided and labeled using a fluorescent dye (e.g., AlexaFluor 647) before being prepared in a 15 nM antibody cocktail in wash buffer (e.g., 0.5% BSA/1× PBS) for use on the waveguide. Further provided were dioloeyl-sn-glycero-3-phosphocholine (DOPC), 1,2-Dioleoyl-sn-glycero-3-phosphoethanolamine-N-(cap biotinyl) (cap-biotinyl-PE), and whole sheep's blood in Alsever's anti-coagulant solution (2.05% dextrose, 0.8% sodium citrate, 0.0055% citric acid, 0.42% sodium chloride).

The waveguide surfaces were cleaned and functionalized with a lipid bilayer. Waveguides and coverslips were cleaned by bath sonication for 5 minutes each in chloroform, ethanol, and distilled water. They were then dried with argon gas and cleaned using UV-ozone for 40 minutes. Flow cells were assembled by bonding a silicone gasket between clean waveguides and coverslips. The lipid bilayer was prepared from 5 mM stock DOPC and cap biotinyl-PE. The DOPC and cap biotinyl-PE were added to a glass test tube using a syringe needle (e.g., cleaned with chloroform/ethanol 3 times each) to reach a concentration of 2 mM DOPC and 1% cap biotinyl-PE. Chloroform was evaporated under argon gas, and the lipids were rehydrated in 600 µL 1× PBS for 30 minutes on a shaker plate. The lipids were then exposed to ten freeze-thaw cycles by freezing in liquid nitrogen and thawing in warm water. The fluid was then sonicated with a probe tip sonicator (e.g., at a 50% duty cycle) for 6 minutes (e.g., pulse 1 sec on and 1 sec off) to ensure vesicle uniformity. The 70 µL of prepared lipids were pipetted into the assembled flow cell and incubated overnight at 4° C. to encourage bilayer stabilization.

Each assay was performed by clipping the flow cell onto the custom holder and aligning the laser for coupling of light. Next. 2 mL of blocking buffer was injected through the flow cell and allowed to incubate for 1 hour at room temperature. Next. 2 mL wash buffer was injected through the flow cell and the background signal was measured (e.g., relative fluorescence units with no antigen and no antibody present). Then, 200 µL of 15 nM antibody cocktail was injected and incubated at room temperature for 20 minutes. The flow cell was washed, and the non-specific signal (e.g., the interaction of the fluorescently-labelled antibody with the lipid bilayer surface in the absence of antigen) was measured.

With the waveguide now prepared, an amphiphilic pellet was prepared as described previously in Example 1. The amphiphilic pellet was re-suspended in 120 µL of 1×PBS, which was injected into the flow cell of the waveguide and incubated for 45 minutes at room temperature. After incubation, the flow cell was washed, and the specific signal was measured to determine the biomarker concentration.

In some embodiments, a waveguide assay method as described can also be used with the two-step microfluidic device described previously.

General Considerations

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

All features described herein are independent of one another and, except where structurally impossible, can be used in combination with any other feature described herein. For example, a microfluidic device as shown in FIG. 3 can be used in combination with separation units 200 shown in FIG. 11.

As used in this application and in the claims, the singular forms "a," "an," and "the" include the plural forms unless the context clearly dictates otherwise. Additionally, the term "includes" means "comprises." Further, the term "coupled" generally means physically, mechanically, chemically, magnetically, and/or electrically coupled or linked and does not exclude the presence of intermediate elements between the coupled or associated items absent specific contrary language.

In some examples, values, procedures, or apparatus may be referred to as "lowest," "best," "minimum," or the like. It will be appreciated that such descriptions are intended to indicate that a selection among many alternatives can be made, and such selections need not be better, smaller, or otherwise preferable to other selections.

In the description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

In view of the many possible embodiments to which the principles of the disclosure may be applied, it should be recognized that the illustrated embodiments are only preferred examples and should not be taken as limiting the scope. Rather, the scope of the disclosure is at least as broad as the following claims. We therefore claim all that comes within the scope and spirit of these claims.

We claim:

1. A device, comprising:
at least one separation unit defining a first chamber, an opening fluidly coupled to the chamber, and a trap chamber disposed downstream of the opening, the at least one separation unit further defining a second chamber that extends radially outwardly of the opening, the second chamber being offset from the first chamber along a first axis of the device and along a second axis of the device; and
a membrane disposed between the first and second chambers and extending across the opening, the membrane being configured such that when a sample is received in the first chamber and the device is rotated, the sample flows across the membrane and filtrate passes through the membrane into the second chamber and residue flows into the trap chamber.

2. The device of claim 1, wherein:
the opening is a first opening;
the trap chamber is a first trap chamber; and
the second chamber is fluidly coupled to a second opening and a second trap chamber, the membrane extending across the second opening such that when the device is rotated, filtrate disposed in the second chamber flows across the membrane such that the filtrate passes through the membrane into a third chamber and residue of the filtrate is disposed in the second trap chamber, the third chamber being defined by the at least one separation unit and extending radially outwardly of the second opening.

3. The device of claim 2, wherein the second chamber is radially offset from the first chamber toward a radially outer edge of the device, and wherein the third chamber is radially offset from the second chamber toward a radially outer edge of the device.

4. The device of claim 2, wherein the first chamber is configured to receive 90 µL or less of sample liquid.

5. The device of claim 2, further comprising an inlet port fluidly coupled to the first chamber, and an outlet port fluidly coupled to the third chamber.

6. The device of claim 2, wherein the first and third chambers are defined between first, second, and third substrates, the third substrate defining the first and second openings.

7. The device of claim 1, wherein the membrane comprises hydrophilic polycarbonate.

8. The device of claim 1, wherein the at least one separation unit is a first separation unit and wherein the device further comprises one or more additional separation units.

9. The device of claim 1, wherein the device is a circular disk, and the at least one separation unit is one of a plurality of separation units arrayed circumferentially around the circular disk.

10. The device of claim 1, wherein:
the device is a circular disk;
the at least one separation unit comprises an inlet in fluid communication with the first chamber and an outlet in fluid communication with the second chamber; and
the outlet is radially outward of the inlet on the circular disk.

11. The device of claim 1, wherein the trap chamber has a volume such that when the residue is disposed within the trap chamber, the filtrate is displaced radially inwardly and aligns with the opening.

12. A system, comprising:
a first microfluidic separation unit defining a plurality of chambers in fluid communication and separated by a permeable membrane, the first microfluidic separation unit being configured to filter a first filtrate from whole blood by flowing whole blood through the permeable membrane between sequential chambers in a plurality of cross-flow filtration steps;
a second microfluidic separation unit configured to separate the first filtrate into a second filtrate and a residue comprising amphiphilic biomarkers indicative of bacterial infection; and
wherein the first microfluidic separation unit and the second microfluidic separation unit are disposed on a body of a microfluidic device.

13. The system of claim 12, wherein the first microfluidic separation unit is configured to receive 90 μL or less of whole blood.

14. The system of claim 12, wherein the plurality of chambers defined by the first microfluidic separation unit includes a first chamber and a third chamber disposed radially outwardly of the first chamber, the first chamber fluidly coupled to a first opening and a first trap chamber disposed radially outwardly of the first opening, and a second chamber that extends radially outwardly of the first opening, the second chamber being offset from the first chamber and the third chamber along a first thickness axis of the first separation unit, the second chamber being fluidly coupled to a second opening and a second trap chamber disposed radially outwardly of the second opening; and wherein the permeable membrane extends across the first and second openings, the membrane being configured such that when a sample is received in the first chamber and the first separation unit is rotated, the sample flows across the membrane and a first filtrate passes through the membrane and the first opening into the second chamber and such that filtrate disposed in the second chamber flows across the membrane such that the first filtrate passes through the membrane and the second opening into the third chamber.

15. The system of claim 14, wherein the second microfluidic separation unit defines a first chamber and a second chamber, the first chamber fluidly coupled to a first opening and a first trap chamber disposed radially outwardly of the first opening, the second chamber extending radially outwardly of the first opening and being offset from the first chamber along a first thickness axis and along a second longitudinal axis of the second separation unit, the second chamber comprising a second trap chamber disposed radially outwardly of the first opening; and a membrane extending across the first opening, the membrane being configured such that when the first filtrate is received in the first chamber and the second separation unit is rotated, the first filtrate flows across the membrane and the second filtrate passes through the membrane and the first opening into the second chamber and the residue flows into the first trap chamber.

* * * * *